(12) United States Patent
Girard et al.

(10) Patent No.: US 10,097,699 B2
(45) Date of Patent: Oct. 9, 2018

(54) ADVERTISER SUPPORTED BANDWIDTH PLATFORM

(71) Applicant: Aquto Corporation, Boston, MA (US)

(72) Inventors: Nicolas Girard, Boston, MA (US);
Yusun Kim Riley, Weston, MA (US)

(73) Assignee: Aquto Corporation, Boston, MA (US)

( * ) Notice: Subject to any disclaimer, the term of this patent is extended or adjusted under 35 U.S.C. 154(b) by 0 days.

(21) Appl. No.: 13/893,870

(22) Filed: May 14, 2013

(65) Prior Publication Data
US 2014/0220927 A1 Aug. 7, 2014

Related U.S. Application Data

(60) Provisional application No. 61/708,862, filed on Oct. 2, 2012, provisional application No. 61/648,802, filed on May 18, 2012.

(51) Int. Cl.
*H04M 15/00* (2006.01)
*G06Q 30/02* (2012.01)
*H04L 12/14* (2006.01)

(52) U.S. Cl.
CPC ........ *H04M 15/8083* (2013.01); *G06Q 30/02* (2013.01); *G06Q 30/0267* (2013.01); *H04L 12/1467* (2013.01); *H04L 12/1475* (2013.01); *H04M 2215/0192* (2013.01)

(58) Field of Classification Search
CPC ..... H04W 84/12; H04W 12/08; H04W 60/00; H04W 88/16; H04W 36/0016; H04W 36/02; H04W 4/206; H04W 28/08; H04W 4/24; H04W 84/045; H04W 28/0289; H04W 28/22; H04W 36/08; H04W 4/02; H04W 72/048; H04W 72/1263; H04W 74/0816
USPC ....... 455/405; 705/14.49, 14.55; 725/8, 110, 725/31, 131
See application file for complete search history.

(56) References Cited

U.S. PATENT DOCUMENTS

| | | | |
|---|---|---|---|
| 7,206,754 B1 * | 4/2007 | Spector | ...................... 705/14.38 |
| 7,249,059 B2 | 7/2007 | Dean et al. | |
| 7,263,076 B1 | 8/2007 | Leibovitz et al. | |

(Continued)

FOREIGN PATENT DOCUMENTS

| | | |
|---|---|---|
| CN | 1808793 | 6/2003 |
| GB | 2475733 | 6/2011 |

(Continued)

OTHER PUBLICATIONS

International Search Report for App. Ser. No. PCT/US13/40855, dated Jan. 3, 2014.

(Continued)

*Primary Examiner* — Natasha W Cosme
(74) *Attorney, Agent, or Firm* — Ohlandt, Greeley, Ruggiero & Perle, L.L.P.

(57) ABSTRACT

Among other things, a content item is received that is associated with an offer for wireless network credit. The wireless network credit is redeemable for free or discounted data usage of one or more metered wireless networks. In response to a selection input, the content item is presented to a user. Data is transmitted reflecting the presentation of the content item to a remote server to cause the remote server to add the mobile broadband credit to an account.

17 Claims, 32 Drawing Sheets

(56) References Cited

U.S. PATENT DOCUMENTS

| | | | |
|---|---|---|---|
| 7,308,426 | B1 | 12/2007 | Pitroda |
| 7,773,971 | B1 | 8/2010 | Barbeau |
| 7,826,834 | B2 | 11/2010 | Hook et al. |
| 7,848,960 | B2 | 12/2010 | Rampell et al. |
| 8,060,520 | B2 | 11/2011 | Koran |
| 8,103,546 | B1 | 1/2012 | Des Jardins et al. |
| 8,117,128 | B2 | 2/2012 | Ishibashi |
| 8,401,941 | B1 | 3/2013 | Havemose |
| 2002/0007313 | A1* | 1/2002 | Mai et al. .................. 705/14 |
| 2005/0234915 | A1* | 10/2005 | Ricciulli ............ H04L 47/2441 |
| 2007/0072584 | A1 | 3/2007 | Jain et al. |
| 2007/0189514 | A1 | 8/2007 | Mehta et al. |
| 2008/0167965 | A1 | 7/2008 | Von Nothaus et al. |
| 2008/0244666 | A1 | 10/2008 | Moon et al. |
| 2008/0318559 | A1 | 12/2008 | Porco |
| 2009/0005001 | A1 | 1/2009 | Sweeney |
| 2009/0089165 | A1* | 4/2009 | Sweeney ............. G06Q 30/02 705/14.27 |
| 2010/0023395 | A1 | 1/2010 | Bugenhagen |
| 2010/0075630 | A1* | 3/2010 | Tillitt ................. H04W 4/24 455/406 |
| 2010/0169175 | A1 | 7/2010 | Koran |
| 2010/0188994 | A1* | 7/2010 | Raleigh ........... G06Q 10/06375 370/252 |
| 2010/0223136 | A1 | 9/2010 | Wormald et al. |
| 2010/0262970 | A1 | 10/2010 | Havemose |
| 2010/0287282 | A1 | 11/2010 | MacLaughlin |
| 2011/0066444 | A1* | 3/2011 | Fish ................ H04N 21/25435 705/1.1 |
| 2011/0082756 | A1 | 4/2011 | Eisnor et al. |
| 2011/0087526 | A1 | 4/2011 | Morgenstern et al. |
| 2011/0124390 | A1 | 5/2011 | Wilen |
| 2011/0154383 | A1 | 6/2011 | Hao et al. |
| 2012/0036051 | A1 | 2/2012 | Sachson |
| 2012/0101952 | A1 | 4/2012 | Raleigh et al. |
| 2012/0150746 | A1 | 6/2012 | Graham |
| 2012/0209720 | A1 | 8/2012 | Plut |
| 2012/0265604 | A1* | 10/2012 | Corner .................. G06Q 30/02 705/14.39 |
| 2013/0030889 | A1 | 1/2013 | Davich et al. |
| 2013/0085869 | A1* | 4/2013 | Carlson ............. G06Q 30/0226 705/14.72 |

FOREIGN PATENT DOCUMENTS

| | | | |
|---|---|---|---|
| JP | 2004110193 A | 4/2004 | |
| JP | 2006079203 A | 3/2006 | |
| JP | 2007013396 A | 1/2007 | |
| WO | WO 2010037995 A1 * | 4/2010 | ............. H04H 60/19 |
| WO | WO 2012/170589 | 12/2012 | |
| WO | WO 2013/053049 | 4/2013 | |
| WO | WO 2013/173270 | 11/2013 | |
| WO | WO 2013/173308 | 11/2013 | |
| WO | WO 2015/006323 | 1/2015 | |

OTHER PUBLICATIONS

Application History for U.S. Appl. No. 13/893,744, filed May 14, 2013.
International Search Report for App. Ser. No. PCT/US13/40911, dated Sep. 17, 2013.
Application History for U.S. Appl. No. 14/325,588, filed Jul. 8, 2014.
International Preliminary Report on Patentability for App. Ser. No. PCT/US2013/040855, dated Nov. 18, 2014.
International Search Report and Written Opinion for App. Ser. No. PCT/US14/45746, dated Jan. 22, 2015.
International Preliminary Report on Patentability for App. Ser. No. PCT/US13/40911, dated Oct. 13, 2015.
Supplementary European Search Report for App. Ser. No. EP 13 79 0906, dated Nov. 5, 2015.
Supplementary European Search Report for App. Ser. No. EP 13 79 1381, dated Nov. 5, 2015.
U.S. Appl. No. 13/893,744, filed May 14, 2013.
U.S. Appl. No. 14/325,588, filed Jul. 8, 2014.
Application as filed for U.S. Appl. No. 14/962,144, filed Dec. 8, 2015.
Application as filed for U.S. Appl. No. 14/962,169, filed Dec. 8, 2015.
Application as filed for U.S. Appl. No. 14/962,207, filed Dec. 8, 2015.
Application as filed for U.S. Appl. No. 14/962,226, filed Dec. 8, 2015.
International Preliminary Report on Patentability for App. Ser. No. PCT/US14/45746, dated Jan. 12, 2016.
Australian office action from Australian patent application No. 2013263030 dated Apr. 13, 2016 (3 pages).
Chinese office action with English translation issued in Chinese application No. 201380038165.1 dated Dec. 23, 2016 (34 pages).
Australian office action from Australian patent application No. 2013263030 dated Mar. 21, 2017 (7 pages).
Chinese Office Action for the corresponding Chinese application No. 201380038165.1, dated Jan. 19, 2018, 21 pages.
Japanese Office Action for the corresponding Japanese application No. 2015-512747, dated Jun. 27, 2018, 6 pages.

* cited by examiner

Redemption Call Flow

Earning Call Flow

Link Device Sequence Diagram

Redemption Sequence Diagram

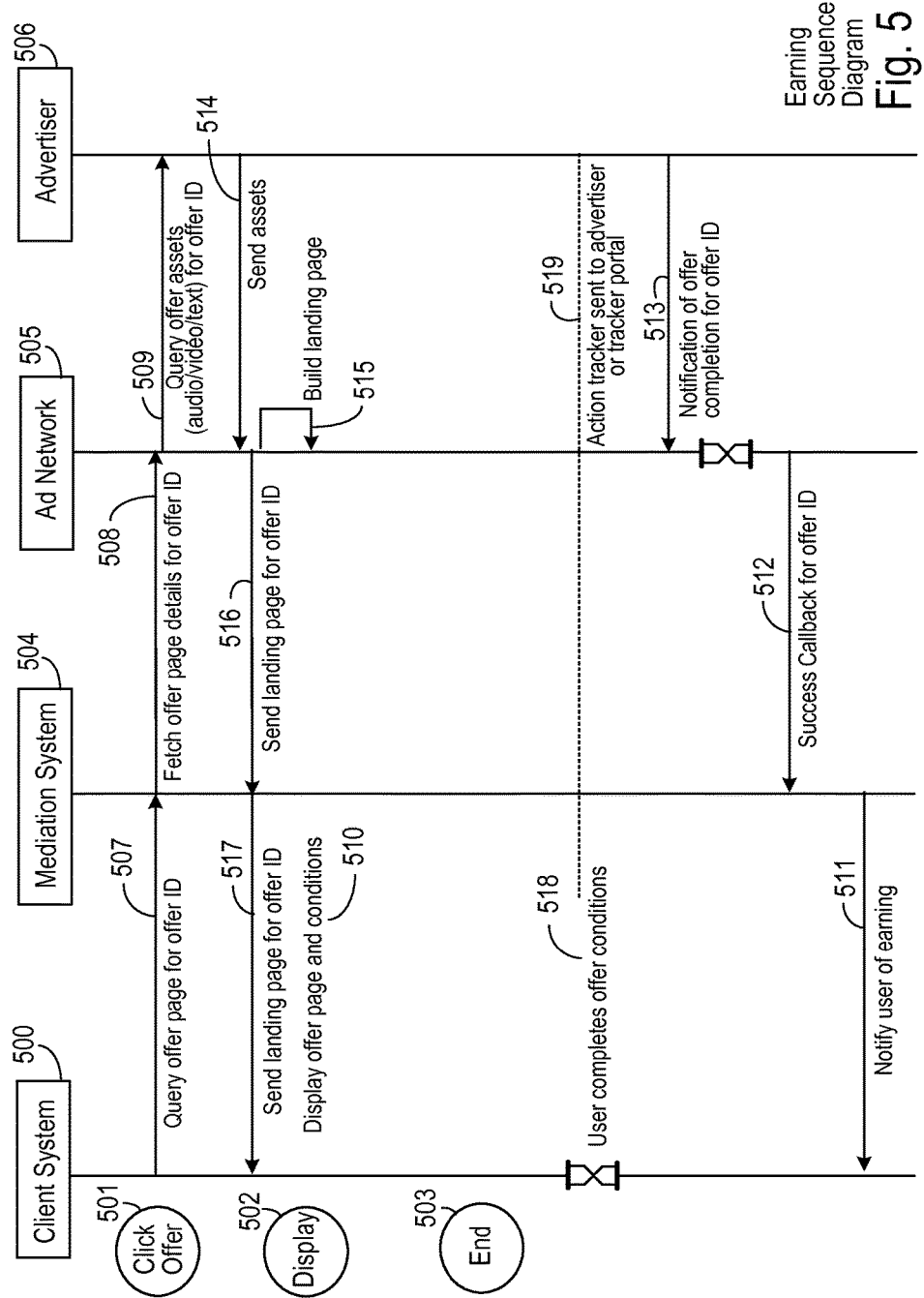

Dynamic Offer Wall Generation Flow Chart

Earning Flow

Earning Flow

Redeem Flow

Redeem Flow

Redeem Flow

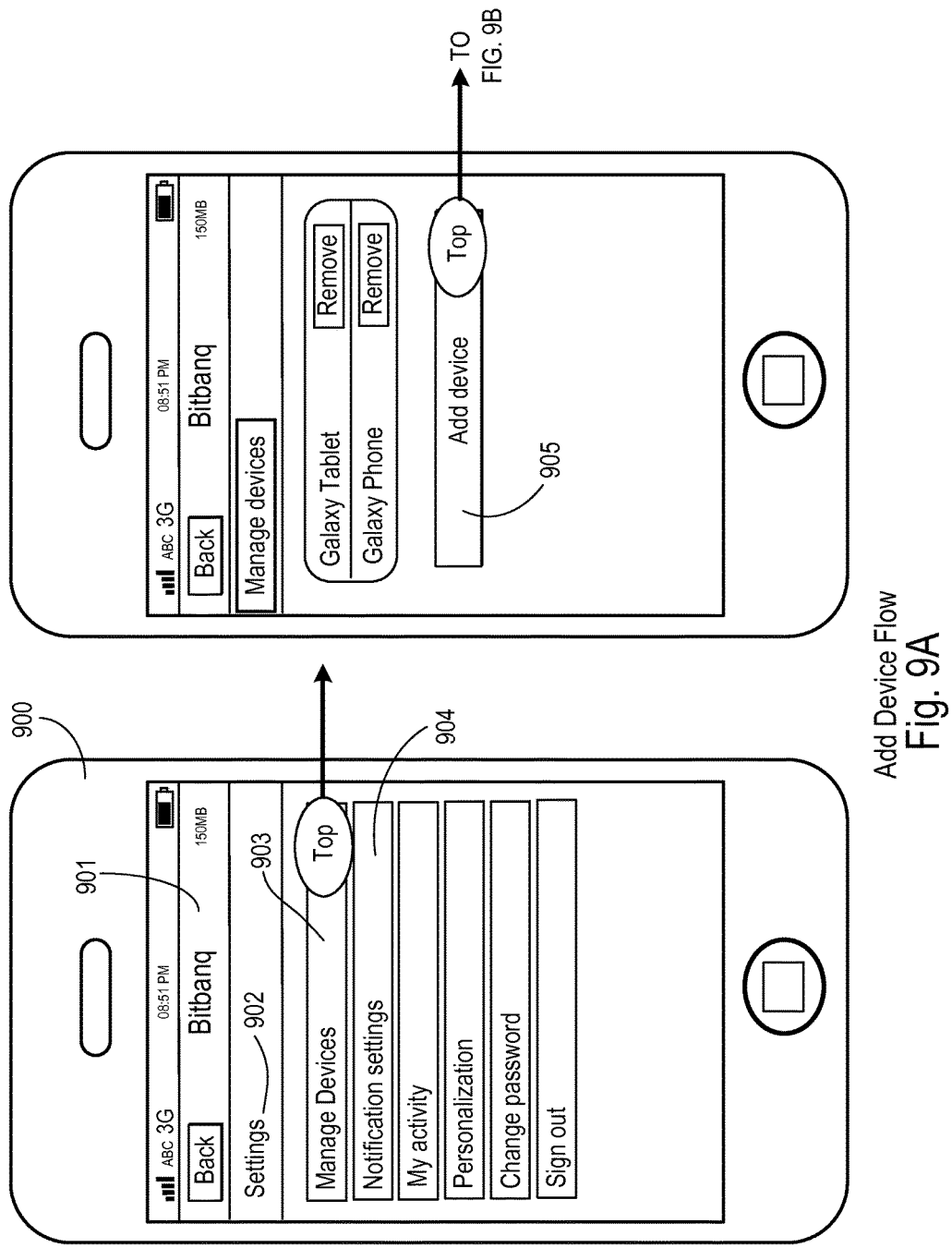

Add Device Flow

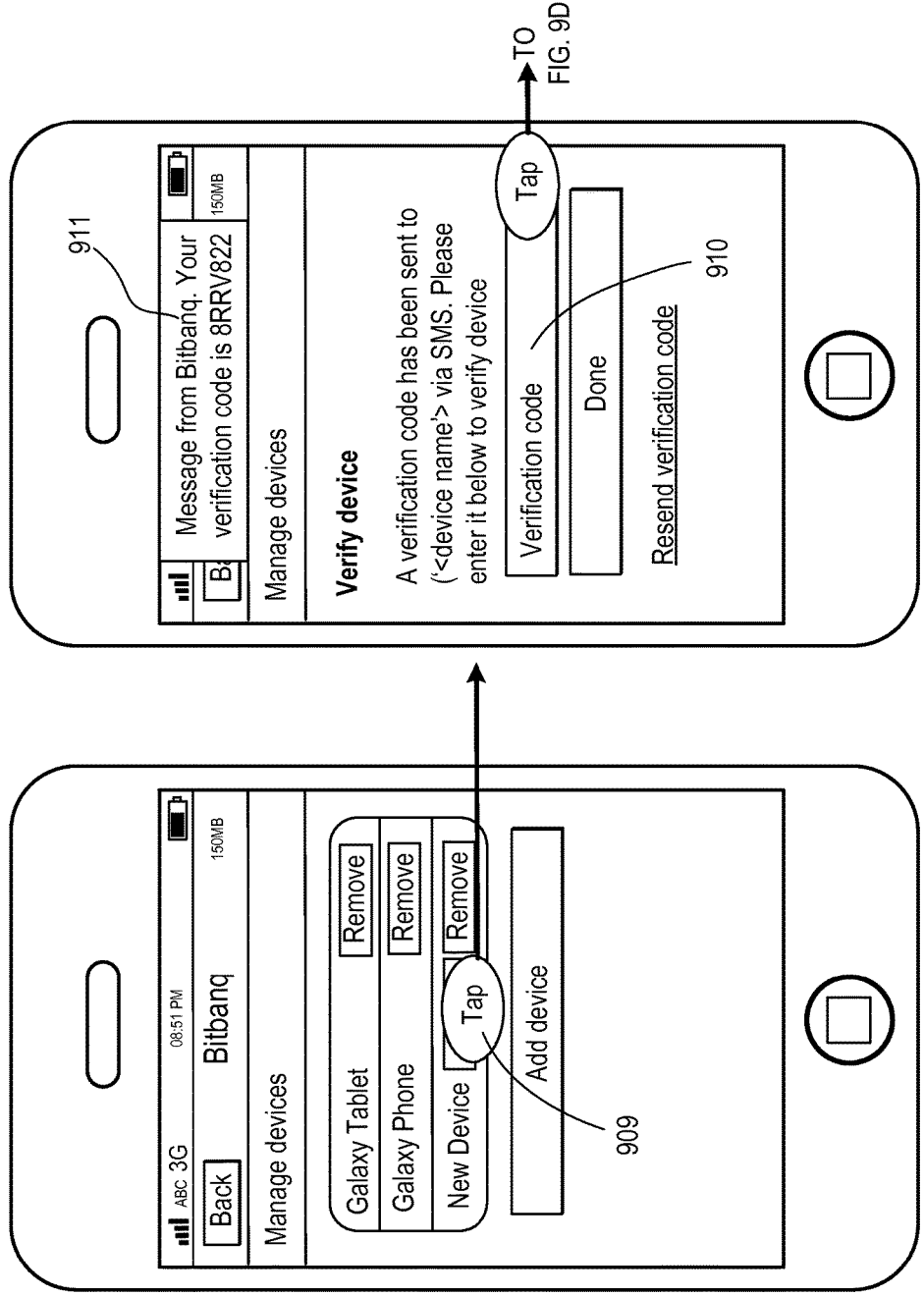

Add Device Flow

Data Model for Dedicated Client System

Data Model for Dedicated Client System

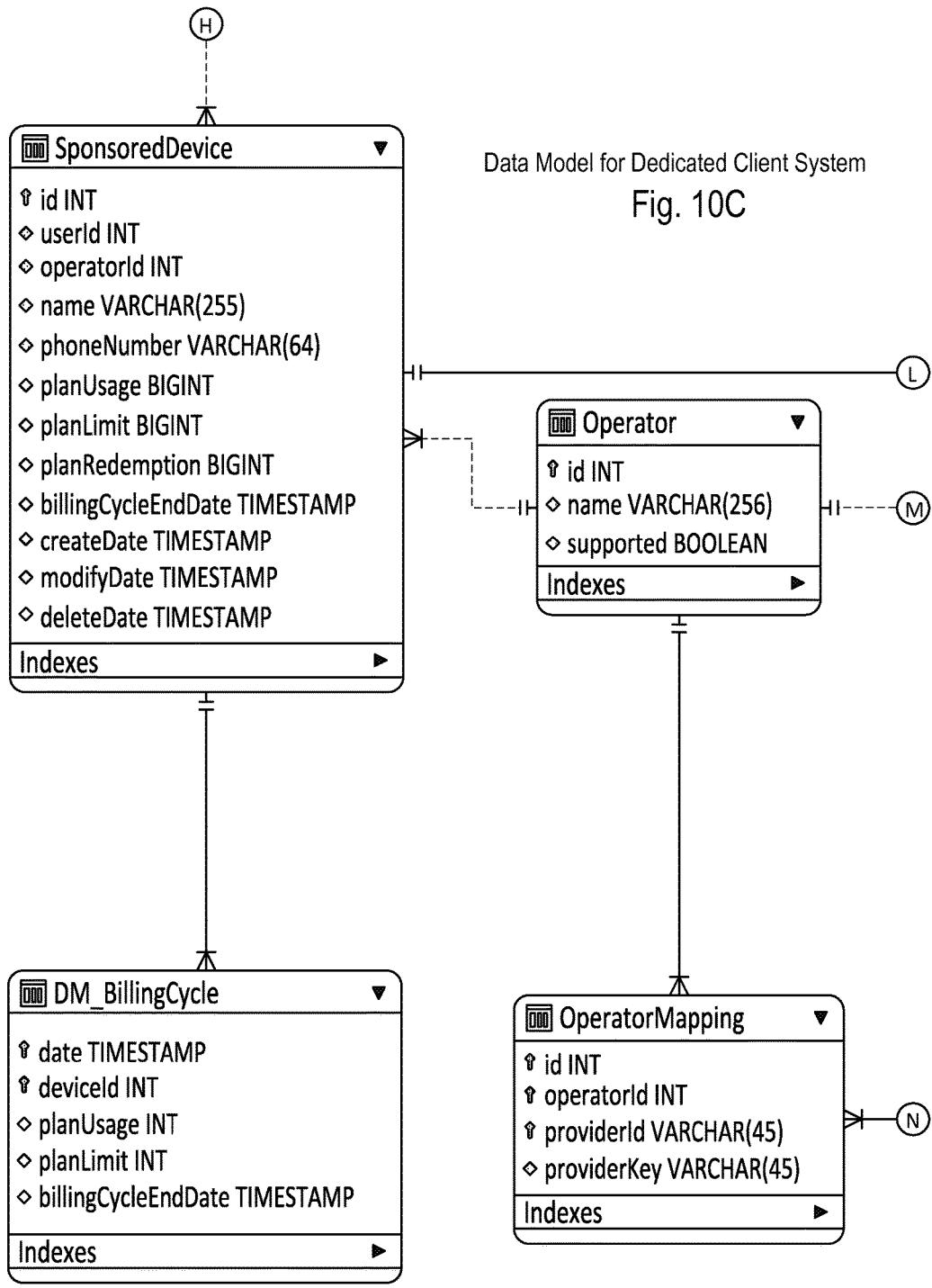

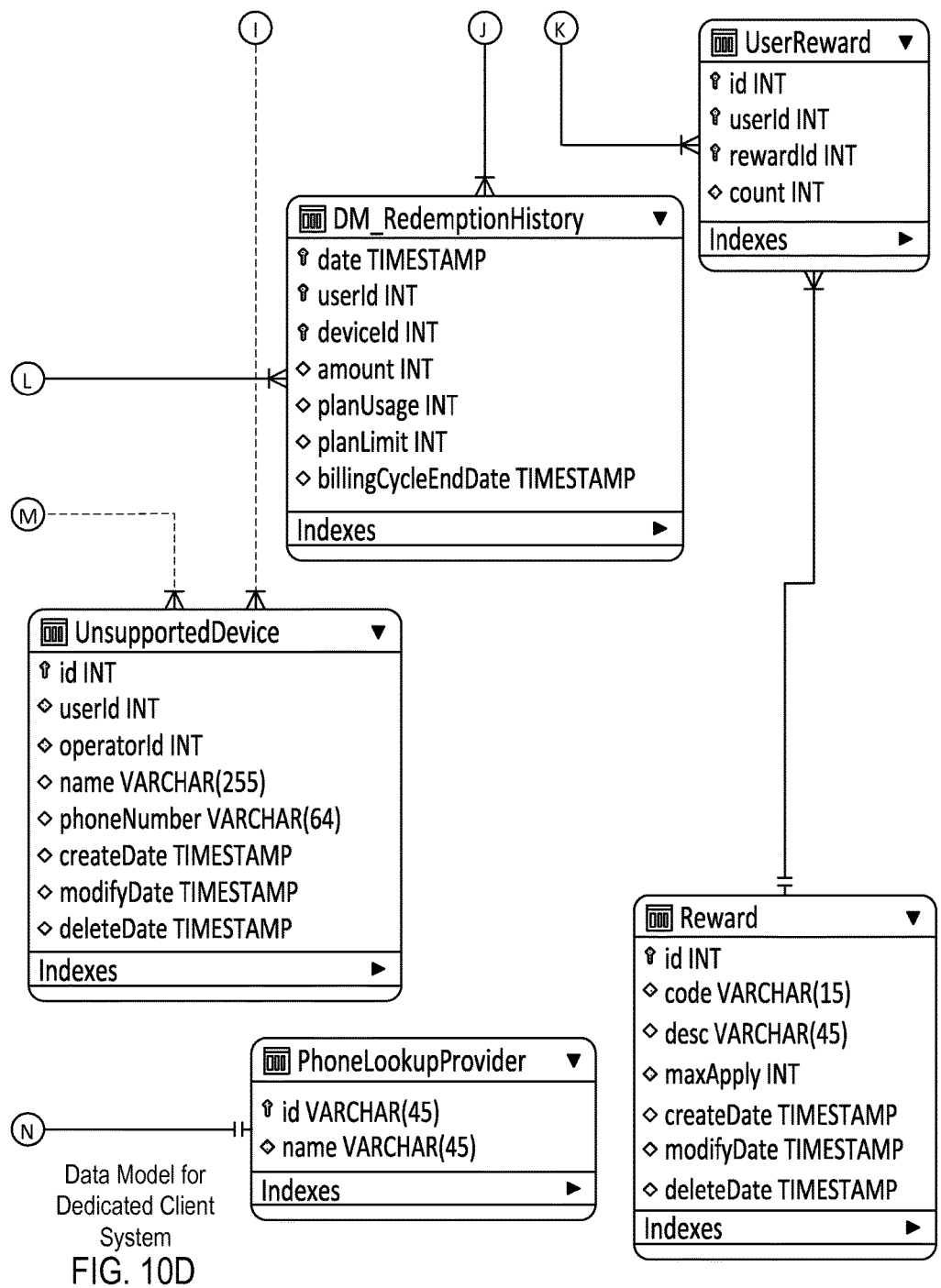
FIG. 10D Data Model for Dedicated Client System

| Entity | Description |
|---|---|
| Core Entities | |
| User | A user of the application, including end users, admins, etc. |
| Sponsored Device | A device this is eligible *and registered* to receive broadband credits |
| Unsupported Device | A device that a user attempted to register but is not eligible to receive broadband credits |
| Management Device | A device that has an installed version of the application |
| Supplemental Entities | |
| Operator | An entity that offers end users broadband |
| Authority | The permission of the User |
| Data Mart Entities | |
| Earning History | The history of the user earning broadband credits |
| Redemption History | The history of the user redeeming broadband credits for actual Operator broadband |

Data Model for Dedicated Client System

Fig. 10E

Data Model for the Operator Management System

Promotion table

| id | Unique private identifier for this promotion record |
|---|---|
| devicePlanId | Unique private identifier for device plan associated with this record. |
| msisdn | Mobile phone number for device in MSISDN format starting with Country Code (e.g. "16175551234"). |
| client | Identifier of client making request (OAuth identifier?) TBD. (Not implemented currently. The clientTransactionId would be unique for each client). |
| created | Date and time the promotion was created (started). |
| completed | Date and time the promotion was completed. NULL if the transaction is pending. |
| clientTransactionId | Transaction identifier provided by client (identifies the promotion transaction from the client). |
| amount | Amount of promotion applied in bytes |
| status | The status of this transaction. Possible values:<br>• PENDING: transaction is still in progress.<br>• SUCCESS: transaction completed successfully.<br>• FAILED: transaction completed unsuccessfully<br>• CANCELED: transaction was canceled by the client prior to completion. |
| confirmationCode | Unique code sent to client to identify this promotion as successfully completed. NULL if the transaction is not successfully completed. |

Usage Table

| id | Unique private identifier for this usage record |
|---|---|
| devicePlanId | Unique private identifier for device plan associated with this record. |
| billingPeriodId | Unique private identifier for billing period associated with this record. |
| msisdn | Mobile phone number for device in MSISDN format starting with Country Code (e.g. "16175551234"). |
| timestamp | Date and time of this record |
| amount | Amount of usage in bytes |
| usageType | Identifies the type of usage (e.g., normal data, overage data, promotional) |

Data Model for the Operator Management System

Fig. 11B

DevicePlan Table

| | |
|---|---|
| id | Unique private identifier for devicePlan record. |
| msisdn | Mobile phone number for device in MSISDN format starting with Country Code (e.g. "16175551234"). |
| planType | identifies the data plan as either prepaid or postpaid. |
| dataLimit | Data plan limit in bytes. |
| promoLimit | Promotional data limit in bytes |
| periodLength | Length of billing period for this device plan in seconds. Specifying the interval in seconds allows for any arbitrary billing period Interval per device plan for flexible testing and demo capabilities (e.g. per day, per week, per month, per hour, etc.) |

BillingPeriod table

| | |
|---|---|
| id | Unique private identifier for billing period record. |
| devicePlanId | Unique private identifier for device plan associated with this billing period record. |
| startDate | Start of record (e.g. billing cycle start). |
| endDate | End of record (e.g. billing cycle end). |
| dataUsed | Amount of data used in bytes. |
| overLimitUsed | Amount of data in excess of the "data limit" used in in bytes. |
| promoAvail | Amount of promotional data available for use in bytes. |
| promoUsed | Amount of promotional data used in bytes |

Data Model for the Operator Management System

Fig. 11C

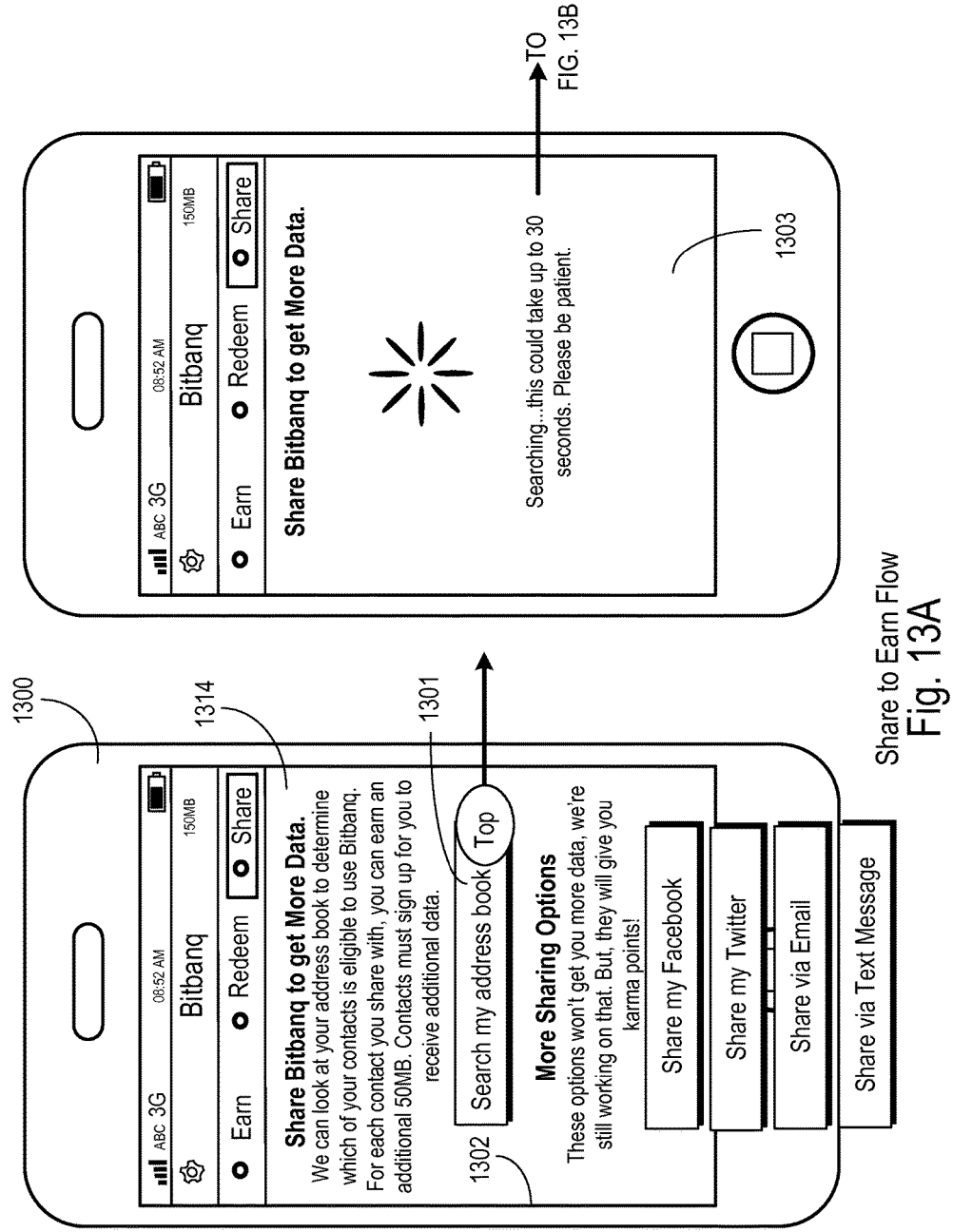

Share to Earn Flow

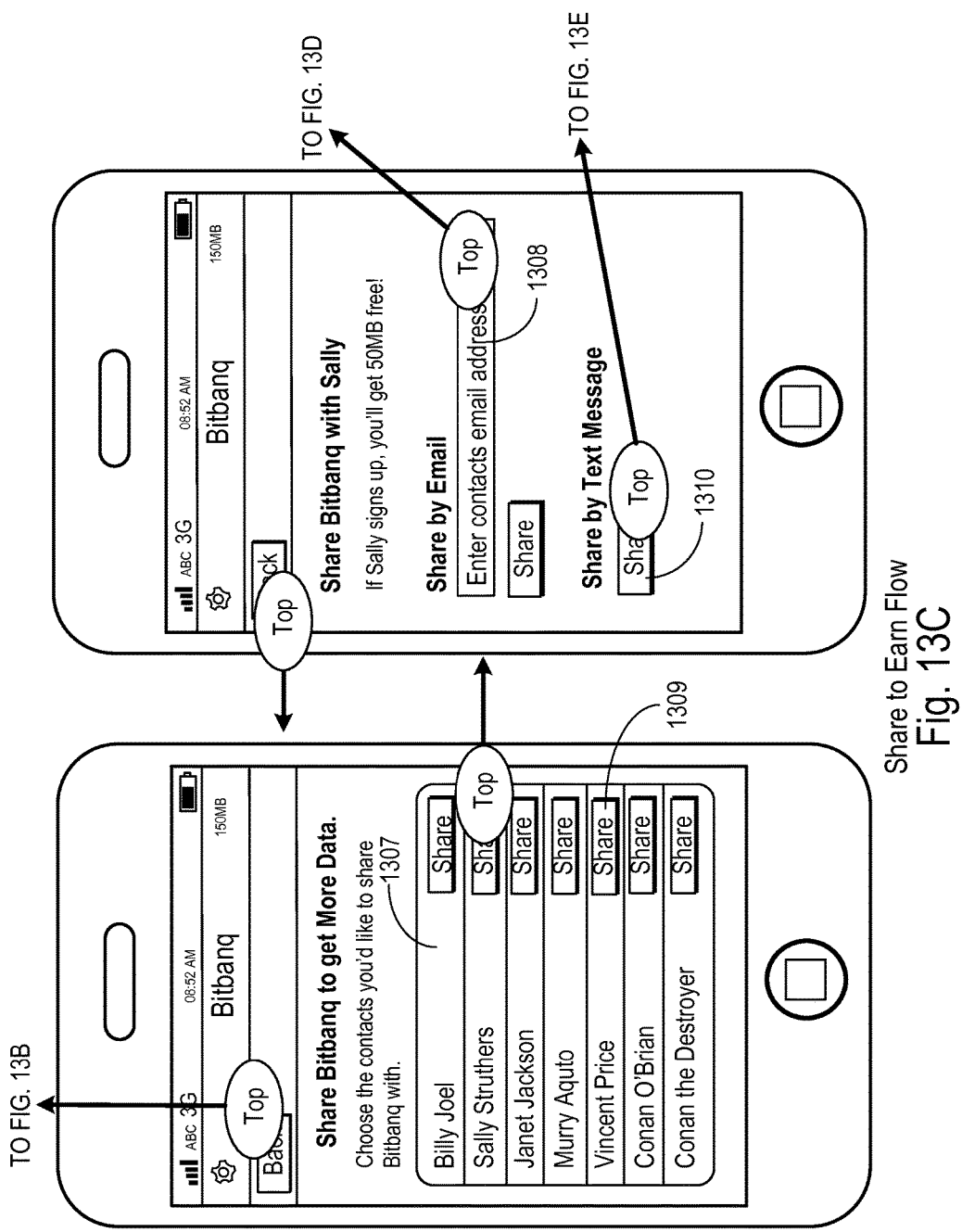
Fig. 13C Share to Earn Flow

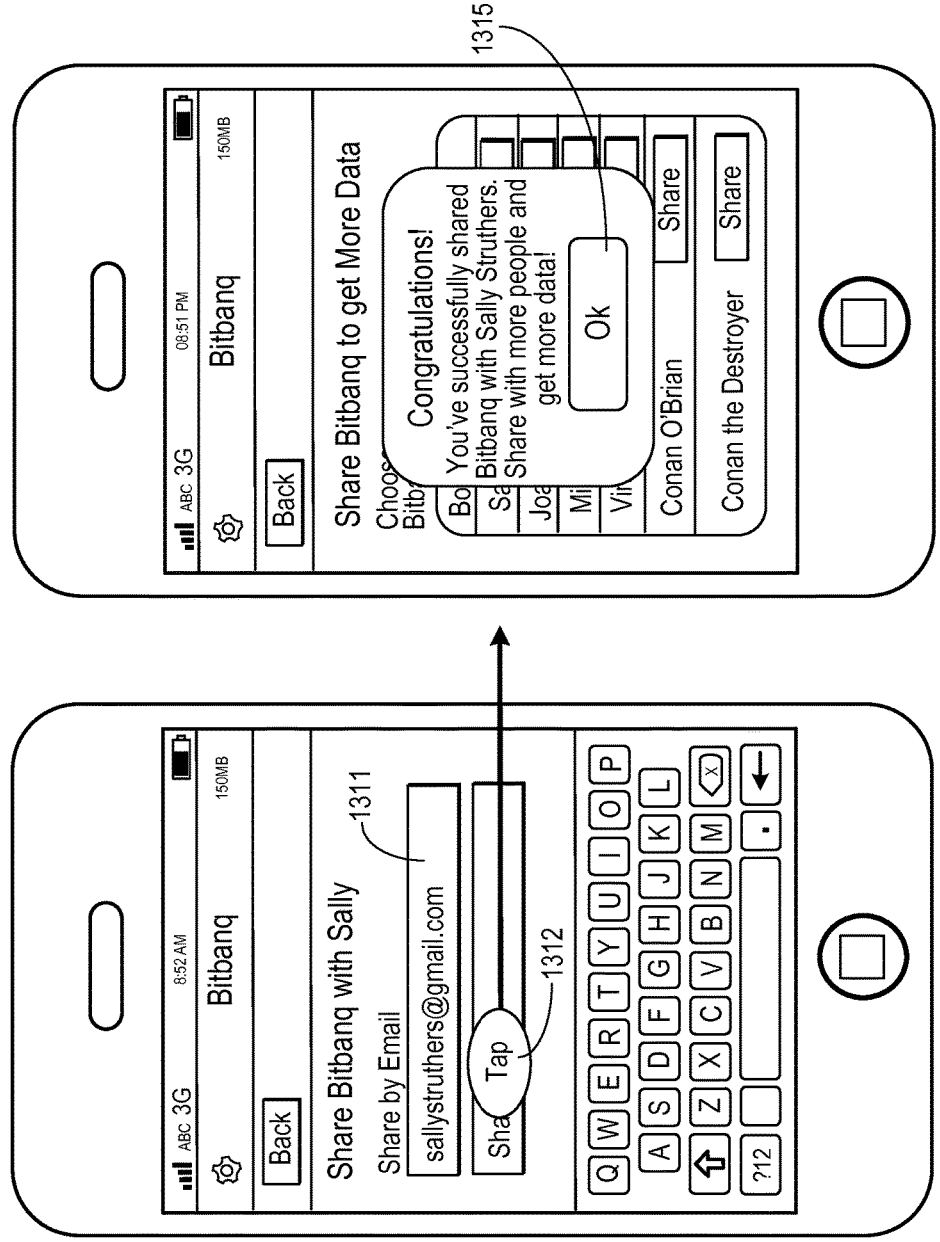
Fig. 13D Share to Earn Flow

Share to Earn Flow

ADVERTISER SUPPORTED BANDWIDTH PLATFORM

CROSS-REFERENCE TO RELATED APPLICATION

Priority is hereby claimed to U.S. Provisional Application No. 61/648,802, which was filed on May 18, 2012 and U.S. Provisional Application No. 61/708,862, which was filed on Oct. 2, 2012. The contents of U.S. Provisional Application No. 61/648,802 and U.S. Provisional Application No. 61/708,682 are hereby incorporated by reference into this disclosure.

BACKGROUND

With the advent of mobile devices more powerful than the workstations of just a few years ago and the introduction of cellular technologies faster than their fixed line counterparts, mobile computing has become the preferred way to consume content, contributing to large amounts of data being carried over cellular networks, and growing at an fast pace. Unlike fixed wired networks, which can be expanded by laying more cable, wireless network capacity is limited by the capacity of the shared wireless medium in a region. Thus, wireless network capacity is an acutely limited resource as a direct result of a finite set of available frequencies and the laws of physics that limit the number of bits than can be carried by each hertz. The combination of both observations creates a situation where demand for wireless network capacity will quickly exceed the supply.

Mobile operators (i.e., operators of wireless networks) are spending capital acquiring the rights to spectrum frequencies, building out network infrastructure to carry the ever-increasing amount of traffic over their wireless networks, without being able to pass on the cost to their subscribers. This untenable situation has forced the telecom industry to move from unlimited pricing to tier pricing. But tier pricing is not a satisfying and cost-effective solution as it restricts mobile, on-the-go consumption and often, results in overage when subscribers inevitably hit their data limits, i.e., consume more than their data allotment. As an example, streaming a 2-hour movie in HD on a mobile tablet over fourth-generation cellular technologies will result in a data usage greater than most of the highest tiers offered by mobile operators for a month worth. Subscribers want more mobile broadband at no additional cost while mobile operators need incremental revenues to account for the added load on their networks and continue investing in their infrastructure.

SUMMARY

In general, in an aspect, a content item is received that is associated with an offer for wireless network credit. The wireless network credit is redeemable for free or discounted data usage of one or more metered wireless networks. In response to a selection input, the content item is presented to a user. Data is transmitted reflecting the presentation of the content item to a remote server to cause the remote server to add the mobile broadband credit to an account.

Implementations may include one or more of the following features. The data is transmitted to a remote server to cause the redemption of wireless network credit in the account by a wireless network operator server. The wireless network credit is redeemed as a discount on a fee for an existing wireless network data plan. The wireless network credit is redeemed to access pay-per-view or subscription content. The wireless network credit is redeemed to upgrade a wireless network data plan. The wireless network credit is redeemed in at least two wireless network data plans associated with the user. Data is transmitted to a remote server to cause the transfer of wireless network credit from the account to a second account associated with a different user. The transfer of wireless network credit is facilitated by a social network. The content item includes a registration form and the wireless mobile credit offer is contingent on completion of a registration transaction. The content item includes a review or comment form and the wireless mobile credit offer is contingent on submission of a comment or review. Usage of a wireless network data plan is monitored. Upon detecting that the usage of the wireless network data plan has exceeded a threshold, data is automatically transmitted to a remote server to cause the redemption of wireless network credit in the account by a wireless network operator server. Upon detecting that the usage of the wireless network data plan has exceeded a threshold, an alert message is presented that suggests the redemption of wireless network credit in the wireless network data plan. The content item is received over a metered wireless network and the data usage required to receive the content item is free. The content item is presented in a user interface provided by a mobile application. The content item is presented in a user interface provided by website accessed using a web browser. Presenting the content item includes displaying the content item on a display. Presenting the content item includes transmitting data specifying the content item over a network to a remote device running a browser that will display the content item remote device.

In general, in an aspect, data is received specifying several content items from one or more remote servers. Each content item is associated with an offer for wireless network credit and the wireless network credit is redeemable for free or discounted data usage of one or more metered wireless networks. One or more of the offers is selected for presentation to a user. Data is transmitted reflecting the one or more selected offers to a first user device.

Implementations may include one or more of the following features. A conversion rate is determined for converting a bid associated with one of the several content items to an offer for wireless network credit. Data is received reflecting the presentation of a content item from the first user device. The mobile broadband credit of the offer associated with the content item is added to an account. Data is received reflecting the presentation of a second content item from a second user device. The mobile broadband credit of an offer associated with the second content item is added to the account. Data is transmitted to a wireless network operator server to cause the redemption of wireless network credit from an account for the user in a wireless network data plan for the user. The wireless network credit is redeemed as a discount on the fee for an existing wireless network data plan. The wireless network credit is redeemed to access pay-per-view or subscription content. The wireless network credit is redeemed to upgrade the wireless network data plan. Data is transmitted to at least two wireless network operator servers to cause the redemption of wireless network credit from an account for the user in at least two wireless network data plans for the user. Wireless network credit is transferred between an account for the user and a second account for a different user. Contextual data is received about the user from a wireless network provider that provides the user with a wireless network data plan. The selection of offers for presentation to the user is based on the contextual data about the user. The one or more of the offers are selected based in part on campaign parameters received from one of the remote servers. Parameters are received defining a redemption policy for a mobile network operator, including a limitation on the amount of credit that can be redeemed in a mobile data plan provided by the mobile network operator. The first user device is verified as eligible to redeem wireless network credit.

In general, in an aspect, offers are presented to a user on a wireless device for the user to engage in defined activities in exchange for corresponding value that can be redeemed for wireless data communication service. The user is enabled to engage in one of the defined activities, and based on the user engaging in the defined activity, information is generated useful in crediting the user with the corresponding value.

Implementations may include one or more of the following features. The activities include an achievement with respect to an application running on the wireless device. The activities include observing or interacting with a presentation of content. The content includes an advertisement. Presenting the offers to a user includes specifying an activity, a corresponding amount of the value that will be credited, and an identity of a sponsor of each of the offers. The offers are aggregated from two or more different sponsors. The sponsors include advertisers. The offers are aggregated from two or more advertising networks. The offers are selected based on information collected or learned about the user. The offers are presented to the user in an application running on the wireless device. The application is dedicated to the presentation and implementation of the offers. The application presents the offers as an add-on to other existing features. The application includes a website or an add-on to a website or an application hosted by a party. The party includes a content provider. The party includes a publisher. The application or add-on includes loyalty program features. The generated information is communicated to a server to enable crediting the user with the corresponding value. Information is presented to the user about amounts of value that have been credited to the user. The user can redeem credited value for wireless data communication service. The wireless data communication service may be redeemed from two or more different wireless data plans. The user can pre-authenticate or pre-authorize one or more wireless data plans for redemption of the value. The value can be redeemed in no more than a single step. A user can connect to a social network to share information about the user's activities. The defined activities that a user can engage in in exchange for value include activities related to a social network in which the user participates. The user can transfer part or all of the value to another party. Information is monitored that is associated with a data plan of the user. The information includes at least one of a balance, a billing cycle, or usage information. The monitored information is analyzed. Depletion of a data plan is predicted based on the monitored information. The user is advised to take an action based on the monitored information. At least some of the value is automatically applied to a data plan based on the analyzing. A user can specify preferences that govern the applying of the value to the data plan. The value is credited to an account of the user. The account of the user spans activities of the user with respect to two or more independent parties. The account of the user is confined to activities of the user with respect to a single party.

In general, in an aspect, an add-on facility is provided for use with an existing application, applet, webpage, browser, or other executable program that provides a user interface. The add-on facility includes presentation layers implemented as modules that enable collection, redemption, and exchange of mobile data broadband credits.

Implementations may include one or more of the following features. The modules, through the user interface of the executable program, present at least one of banners, callouts, and separate panes. The modules are usable by advertisers on a third-party application to cause their advertisements to be eligible for users who view or interact with them to earn mobile data credits.

In general, in an aspect, from two or more independent sources, information is received representing offers by the sources to users of wireless devices to give the users value that can be redeemed for wireless data communication service in exchange for the users engaging in defined activities on the wireless devices.

Implementations may include one or more of the following features. A selection is made among the offers and the selected offers are aggregated for delivery to the wireless devices for presentation to the users. The sources include advertisers. The defined activities include having advertisements presented to the users. The offers are selected and aggregated based on information about the users. The information includes information provided by wireless operators. Conversions are managed between worth that is attributed to the offers by the sources and the worth that is attributed to the wireless data communication service for which the value will be exchanged.

In general, in an aspect, on a server accounts are maintained for users of wireless devices. Information is received about credits or debits of value that can be redeemed for wireless data communication service that are attributable to activities of the users of the wireless devices. Transactions are entered in the accounts based on the received information.

In general, in an aspect, at a server, there is interaction over a communication network with two or more independent wireless network operators with respect to data plans of subscribers of the operators. From the server, information is sent to the wireless network operators that identifies value that (a) has been accumulated by the users based on predefined activities of the users of wireless devices served by the operators and (b) will be redeemed by the wireless network operators in exchange for wireless communication services under the data plans.

Implementations may include one or more of the following features. The interacting with respect to the data plans includes authentication or verification of the users by the operators. The interacting with respect to the data plans includes verification of the edibility of users for the redemptions. The redemptions by the operators occur in real time. The interacting with respect to the data plans includes retrieving information from the operators about the data plans including balance or usage information. The interacting with respect to the data plans includes retrieving contextual attributes of the users. The interacting with respect to data plans includes acquiring bulk wireless data bandwidth.

In general, in an aspect, information is received from wireless operators, advertisers, and content providers about conditions for exchange of value (a) that is to be acquired by users of wireless devices served by the operators by engaging in predefined activities with respect to advertising or content on the wireless devices, and (b) that is to be redeemable on behalf of the users for wireless communication services of the operators, and enabling the information to be used in connection with the acquisition and redemption of the value. The information includes specification by the operators of conditions for users or wireless devices to be eligible to redeem the value. The information includes specification of policies of the operators for redemption of value by eligible users. The information includes specification by advertisers or content providers of conditions of sponsorship campaigns. The information is enabled to be used for monitoring of performance and analytics.

In general, in an aspect, a user of a mobile device can earn mobile data broadband credits for engaging with advertising offers or watching advertisements on the mobile device.

In general, in an aspect, a user of two or more devices including at least one mobile device can earn mobile data broadband credits by engaging in predefined activities on at least two of the devices, the credits being accounted for in a unified credit account.

In general, in an aspect, a user of two or more wireless devices that are associated with data plans of possibly two different wireless communication operators can redeem mobile data broadband credits held in a unified credit account from any of the data plans.

In general, in an aspect, a user can redeem mobile data broadband credits against an existing mobile data plan that is associated with a mobile device of the user, the credits having been acquired by the user engaging with advertising offers or watching advertisements on the mobile device.

In general, in an aspect, a user can redeem mobile data broadband credits in the form of cash back against an existing mobile data plan that is associated with a mobile device of the user, the credits having been acquired by the user engaging with advertising offers or watching advertisements on the mobile device.

In general, in an aspect, a user can redeem mobile data broadband credits for pay-per-view content or a mobile content subscription, the credits having been acquired by the user engaging with advertising offers or watching advertisements on the mobile device.

In general, in an aspect, a user can transfer mobile data broadband credits to another party, the credits having been acquired by the user engaging with advertising offers or watching advertisements on the mobile device, the other party then being able to redeem the credits for value.

In general, in an aspect, a source can transfer to an account maintained for a user of a wireless device credits that can be exchanged for mobile data services. The credits can be transferred to the account in response to the user becoming a subscriber of the services, or recommending the services to another party, or agreeing to continue use of the services.

In general, in an aspect, data is received from two or more independent mobile operators data that represents contextual information about subscribers of mobile services offered by the operators and usage by the subscribers of the services. Based on the data, offers are identified to be made by advertisers to users of wireless devices. On behalf of advertisers, the presentation of the offers is caused to be made to the users.

In general, in an aspect, the terms and status of a mobile data plan and usage of mobile data services under the plan are monitored based on information received from a mobile operator that provides the services and offers the plan, and automatically redeeming credits belonging to a user of a mobile device in exchange for services under the plan, based on information about available credits and on the results of the monitoring.

In general, in an aspect, the terms and status of a mobile data plan and usage of mobile data services under the plan are monitored based on information received from a mobile operator that provides the services and offers the plan. The mobile operator can use the results of the monitoring to promote upgrading of the plan or generation of leads for promotional activity.

In general, in an aspect, in a system in which a user of a mobile device that operates under a mobile plan offered by a mobile operator acquires and redeems credits for mobile services by engaging in predefined activities that themselves use mobile services, the mobile services required for the predefined activities are provided at no charge.

In general, in an aspect, a client-side interface is exposed to a user so that the user can (a) identify offers in which credits for mobile services can be acquired in exchange for the user engaging in predefined activities, (b) acquire the credits by engaging in the activities, (c) redeem the credits for mobile services, and (d) manage an account at a server that holds the user's credits. The exposing of the client-side interface to the client is done through at least one of a native mobile application, a website presented through a browser on a desktop device, a website presented through a browser on a mobile device, or an add-on service library or an SDK for an application or website.

In general, in an aspect, a system includes a data processing apparatus and a memory coupled to the data processing apparatus having instructions stored thereon which, when executed by the data processing apparatus cause the data processing apparatus to perform operations. A content item associated with an offer for wireless network credit is received, where the wireless network credit is redeemable for free or discounted data usage of one or more metered wireless networks. In response to a selection input, the content item is presented to a user. Data reflecting the presentation of the content item is transmitted to a remote server to cause to the remote server to add the mobile broadband credit to an account.

Implementations may include one or more of the following features. The operations include transmitting data to a remote server to cause the redemption of wireless network credit in the account by a wireless network operator server. The wireless network credit is redeemed as a discount on the fee for an existing wireless network data plan. The wireless network credit is redeemed to access pay-per-view or subscription content. The wireless network credit is redeemed to upgrade a wireless network data plan. The wireless network credit is redeemed in at least two wireless network data plans associated with the user. The operations include transmitting data to a remote server to cause the transfer of wireless network credit from the account to a second account associated with a different user. The transfer of wireless network credit is facilitated by a social network. The content item includes a registration form and the wireless mobile credit offer is contingent on completion of a registration transaction. The content item includes a review or comment form and the wireless mobile credit offer is contingent on submission of a comment or review. The operations include monitoring usage of a wireless network data plan. The operations include upon detecting that the usage of the wireless network data plan has exceeded a threshold, automatically transmitting data to a remote server to cause the redemption of wireless network credit in the account by a wireless network operator server. The operations include upon detecting that the usage of the wireless network data plan has exceeded a threshold, presenting an alert message that suggests the redemption of wireless network credit in the wireless network data plan. The content item is received over a metered wireless network and the data usage required to receive the content item is free. The content item is presented in a user interface provided by a mobile application. The content item is presented in a user interface provided by website accessed using a web browser. Presenting the content item includes displaying the content item on a display. Presenting the content item includes transmitting data specifying the content item over a network to a remote device running a browser that will display the content item remote device.

In general, in an aspect, a system includes a network interface configured to receive a content item associated with an offer for wireless network credit. The wireless network credit is redeemable for free or discounted data usage of one or more metered wireless networks. A display is configured to, in response to a selection input, present the content item to a user. A network interface is configured to transmit data reflecting the presentation of the content item to a remote server to cause to the remote server to add the mobile broadband credit to an account.

Implementations may include one or more of the following features. A network interface is included to transmit data to a remote server to cause the redemption of wireless network credit in the account by a wireless network operator server. The wireless network credit is redeemed as a discount on the fee for an existing wireless network data plan. The wireless network credit is redeemed to access pay-per-view or subscription content. The wireless network credit is redeemed to upgrade a wireless network data plan. The wireless network credit is redeemed in at least two wireless network data plans associated with the user. A network interface is included to transmit data to a remote server to cause the transfer of wireless network credit from the account to a second account associated with a different user. The transfer of wireless network credit is facilitated by a social network. The content item includes a registration form and the wireless mobile credit offer is contingent on completion of a registration transaction. The content item includes a review or comment form and the wireless mobile credit offer is contingent on submission of a comment or review.

In general, in an aspect, a module monitors usage of a wireless network data plan. The module includes means for, upon detecting that the usage of the wireless network data plan has exceeded a threshold, automatically transmitting data to a remote server to cause the redemption of wireless network credit in the account by a wireless network operator server.

Implementations may include one or more of the following features. The module includes means for, upon detecting that the usage of the wireless network data plan has exceeded a threshold, presenting an alert message that suggests the redemption of wireless network credit in the wireless network data plan. The content item is received over a metered wireless network and the data usage required to receive the content item is free. The content item is presented in a user interface provided by a mobile application. The content item is presented in a user interface provided by website accessed using a web browser.

In general, in an aspect, a non-transient computer readable medium stores software including instructions executable by a processing device that upon such execution cause the processing device to perform operations including receiving a content item associated with an offer for wireless network credit. The wireless network credit is redeemable for free or discounted data usage of one or more metered wireless networks. In response to a selection input, the content item is presented to a user. Data reflecting the presentation of the content item is transmitted to a remote server to cause the remote server to add the mobile broadband credit to an account.

Implementations may include one or more of the following features. The operations include transmitting data to a remote server to cause the redemption of wireless network credit in the account by a wireless network operator server. The wireless network credit is redeemed as a discount on the fee for an existing wireless network data plan. The wireless network credit is redeemed to access pay-per-view or subscription content. The wireless network credit is redeemed to upgrade a wireless network data plan. The wireless network credit is redeemed in at least two wireless network data plans associated with the user. The operations include transmitting data to a remote server to cause the transfer of wireless network credit from the account to a second account associated with a different user. The transfer of wireless network credit is facilitated by a social network. The content item includes a registration form and the wireless mobile credit offer is contingent on completion of a registration transaction. The content item includes a review or comment form and the wireless mobile credit offer is contingent on submission of a comment or review. The operations include monitoring usage of a wireless network data plan. The operations include upon detecting that the usage of the wireless network data plan has exceeded a threshold, automatically transmitting data to a remote server to cause the redemption of wireless network credit in the account by a wireless network operator server. The operations include upon detecting that the usage of the wireless network data plan has exceeded a threshold, presenting an alert message that suggests the redemption of wireless network credit in the wireless network data plan. The content item is received over a metered wireless network and the data usage required to receive the content item is free. The content item is presented in a user interface provided by a mobile application. The content item is presented in a user interface provided by website accessed using a web browser. Presenting the content item includes displaying the content item on a display. Presenting the content item includes transmitting data specifying the content item over a network to a remote device running a browser that will display the content item remote device.

In general, in an aspect, a system includes a data processing apparatus and a memory coupled to the data processing apparatus having instructions stored thereon which, when executed by the data processing apparatus cause the data processing apparatus to perform operations including receiving data specifying several content items from one or more remote servers. Each content item is associated with an offer for wireless network credit and the wireless network credit is redeemable for free or discounted data usage of one or more metered wireless networks. One or more of the offers are selected for presentation to a user. Data reflecting the one or more selected offers is transmitted to a first user device.

Implementations may include one or more of the following features. The operations include determining a conversion rate for converting a bid associated with one of the several content items to an offer for wireless network credit. The operations include receiving data reflecting the presentation of a content item from the first user device; and adding the mobile broadband credit of the offer associated with the content item to an account. The operations include receiving data reflecting the presentation of a second content item from a second user device; and adding the mobile broadband credit of an offer associated with the second content item to the account. The operations include transmitting data to a wireless network operator server to cause the redemption of wireless network credit from an account for the user in a wireless network data plan for the user. The wireless network credit is redeemed as a discount on the fee for an existing wireless network data plan. The wireless network credit is redeemed to access pay-per-view or subscription content. The wireless network credit is redeemed to upgrade the wireless network data plan. The operations include transmitting data to at least two wireless network operator servers to cause the redemption of wireless network credit from an account for the user in at least two wireless network data plans for the user. Wireless network credit is transferred between an account for the user and a second account for a different user. The operations include receiving contextual data about the user from a wireless network provider that provides the user with a wireless network data plan. The selection of offers for presentation to the user is based on the contextual data about the user. The one or more of the offers are selected based in part on campaign parameters received from one of the remote servers. The operations include receiving parameters defining a redemption policy for a mobile network operator, including a limitation on the amount of credit that can be redeemed in a mobile data plan provided by the mobile network operator. The operations include verifying that the first user device is eligible to redeem wireless network credit. A system, including a network interface configured to receive data specifying several content items from one or more remote servers, where each content item is associated with an offer for wireless network credit and where the wireless network credit is redeemable for free or discounted data usage of one or more metered wireless networks; a means for selecting one or more of the offers for presentation to a user; and a network interface configured to transmit data reflecting the one or more selected offers to a first user device. A module is included to determine a conversion rate for converting a bid associated with one of the several content items to an offer for wireless network credit. A network interface is included to receive data reflecting the presentation of a content item from the first user device; and a module configured to add the mobile broadband credit of the offer associated with the content item to an account. A network interface is included to receive data reflecting the presentation of a second content item from a second user device; and adding the mobile broadband credit of an offer associated with the second content item to the account. A network interface is included to transmit data to a wireless network operator server to cause the redemption of wireless network credit from an account for the user in a wireless network data plan for the user. The wireless network credit is redeemed as a discount on the fee for an existing wireless network data plan. The wireless network credit is redeemed to access pay-per-view or subscription content. The wireless network credit is redeemed to upgrade the wireless network data plan. A network interface is included to transmit data to at least two wireless network operator servers to cause the redemption of wireless network credit from an account for the user in at least two wireless network data plans for the user. Wireless network credit is transferred between an account for the user and a second account for a different user. A network interface is included to receive contextual data about the user from a wireless network provider that provides the user with a wireless network data plan. The selection of offers for presentation to the user is based on the contextual data about the user. The one or more of the offers are selected based in part on campaign parameters received from one of the remote servers. A network interface is included to receive parameters defining a redemption policy for a mobile network operator, including a limitation on the amount of credit that can be redeemed in a mobile data plan provided by the mobile network operator. Means are included for verifying that the first user device is eligible to redeem wireless network credit.

In general, in an aspect, a non-transient computer readable medium stores software including instructions executable by a processing device that upon such execution cause the processing device to perform operations including receiving data specifying several content items from one or more remote servers. Each content item is associated with an offer for wireless network credit. The wireless network credit is redeemable for free or discounted data usage of one or more metered wireless networks. One or more of the offers are selected for presentation to a user. Data reflecting the one or more selected offers are transmitted to a first user device.

Implementations may include one or more of the following features. The operations include determining a conversion rate for converting a bid associated with one of the several content items to an offer for wireless network credit. The operations include receiving data reflecting the presentation of a content item from the first user device; and adding the mobile broadband credit of the offer associated with the content item to an account. The operations include receiving data reflecting the presentation of a second content item from a second user device; and adding the mobile broadband credit of an offer associated with the second content item to the account. The operations include transmitting data to a wireless network operator server to cause the redemption of wireless network credit from an account for the user in a wireless network data plan for the user. The wireless network credit is redeemed as a discount on the fee for an existing wireless network data plan. The wireless network credit is redeemed to access pay-per-view or subscription content. The wireless network credit is redeemed to upgrade the wireless network data plan. The operations include transmitting data to at least two wireless network operator servers to cause the redemption of wireless network credit from an account for the user in at least two wireless network data plans for the user. Wireless network credit is transferred between an account for the user and a second account for a different user. The operations include receiving contextual data about the user from a wireless network provider that provides the user with a wireless network data plan. The selection of offers for presentation to the user is based on the contextual data about the user. The one or more of the offers are selected based in part on campaign parameters received from one of the remote servers. The operations include receiving parameters defining a redemption policy for a mobile network operator, including a limitation on the amount of credit that can be redeemed in a mobile data plan provided by the mobile network operator. The operations include verifying that the first user device is eligible to redeem wireless network credit.

These and other features, aspects, and implementations, and combinations of them, can be expressed as methods, methods of doing business, apparatus, systems, components, software products, means and steps for performing functions, and in other ways.

These and other embodiments can each optionally include one or more of the following features. Users may be enabled to earn mobile data broadband credits for engaging with advertising offers or watching advertisements. Users may be enabled to earn mobile data broadband credits on different devices and contribute credits towards a single piggybank account. Users may be enabled to link multiple devices and data plans (even with multiple network operators) and redeem mobile data broadband credits from the piggybank on any of those mobile data plans. Mobile data broadband credits may be redeemed towards an existing mobile data plan. Mobile data broadband credits may be redeemed as dollar credit towards an existing data plan (e.g., cash back). Mobile data broadband credits may be redeemed for pay-per-view content or mobile content subscription in lieu of mobile data broadband credits. Users may be enabled to gift, via a social network, mobile data broadband credits between wireless subscribers. Users may be given mobile data broadband credits as incentives to sign up for the service or for recommending the service (e.g., loyalty play for signup, affiliate sign ups, continued use). Advertising offers may be mediated and targeted based on contextual data about subscriber extracted from mobile network operators' networks. A smart data plan and usage monitoring and auto redemption policies may be provided. Data plan and usage monitoring may lead to plan upgrade or lead generation for a mobile network operator. Wireless network carriage associated with the completion of an offer may be zero-rated (i.e., no "burn to earn"). The client interface can be instantiated as a native mobile application, a website for desktop or mobile browsers, or can be packaged as an add-on service library or SDK for a third-party application or website.

Particular embodiments of the invention can be implemented to realize none, one or more of the following advantages. Some implementations may facilitate monitoring of mobile data usage on personal mobile devices provide wireless network subscriber friendly buffer to reduce the chances of costly mobile data plan overages. Some implementations may facilitate personalization of a user's collection of mobile data plans and cost control by applying credits as needed to each plan from a common pool of credit. Some implementations may allow users to consume more mobile content without spending more money. Some implementations may increase subscriber loyalty to operators of wireless networks to which they subscribe and reduce subscriber churn. Some implementations may expand and protect market share for mobile operators offering mobile data plans. Some implementations may increase mobile operator revenue by allowing advertisers to subsidize consumer's mobile data consumption. Some implementations may provide a data rich environment that enhances targeting of advertisements. Some implementations may enhance user engagement with content items. Some implementations may increase advertising conversion rates.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

FIG. 5 is a sequence diagram describing signaling for an example session to earn a wireless network credit by completing an offer on a client system.

FIG. 9A-D are a sequence of screenshots describing an example client UX for a user linking a device to client system for redemption.

FIG. 10A-E are an example data model used by a dedicated client system.

FIG. 11A-C is an example data model used by the operator management system.

FIG. 13A-E is a sequence of screenshots describing an example client UX for a user earning wireless network credits for sharing and interacting with social networks.

DETAILED DESCRIPTION

A new value-based pricing model for the wireless industry is needed; a new model where packaging mobile broadband as a reward for engagement can create value for stakeholders that are willing to subsidize its cost as a result. This specification discloses a value exchange platform allowing users to earn wireless network credits and redeem those credits on a mobile data plan. Earning wireless network credits is enabled through completing engagement offers, achieving in-application milestones or watching and/or engaging with advertisements.

In some implementations, a user is presented with a wall of offers in a dedicated application and each of the offers lists a sponsor, a reward expressed in terms of a quantity of wireless network credit and one or more actions that upon completion will unlock the reward. The wall of offers may be dynamically assembled through a mediation system sourcing offers from multiple participating advertising networks and sponsors and targeting the user of the wall of offers based on information collected and/or learned about the user.

In some implementations, an add-on component in a third-party application allows a user of that application to earn wireless network credit by accomplishing specific engagement offers within the application. In some implementations, an advertiser of that third-party application can sponsor wireless network credit for the user of the application in exchange for increased advertising exposure in the third-party application. In some implementations, a wireless network credit redemption capability is leveraged to convert and redeem real or virtual currency into mobile broadband, i.e., access to data through a wireless network.

Earned wireless network credit may be maintained in a virtual piggybank. Credits can be redeemed towards new or existing mobile data plans using an operator management system that integrates with the billing and charging systems of the mobile network operators that accept the credits.

Figure 1A:
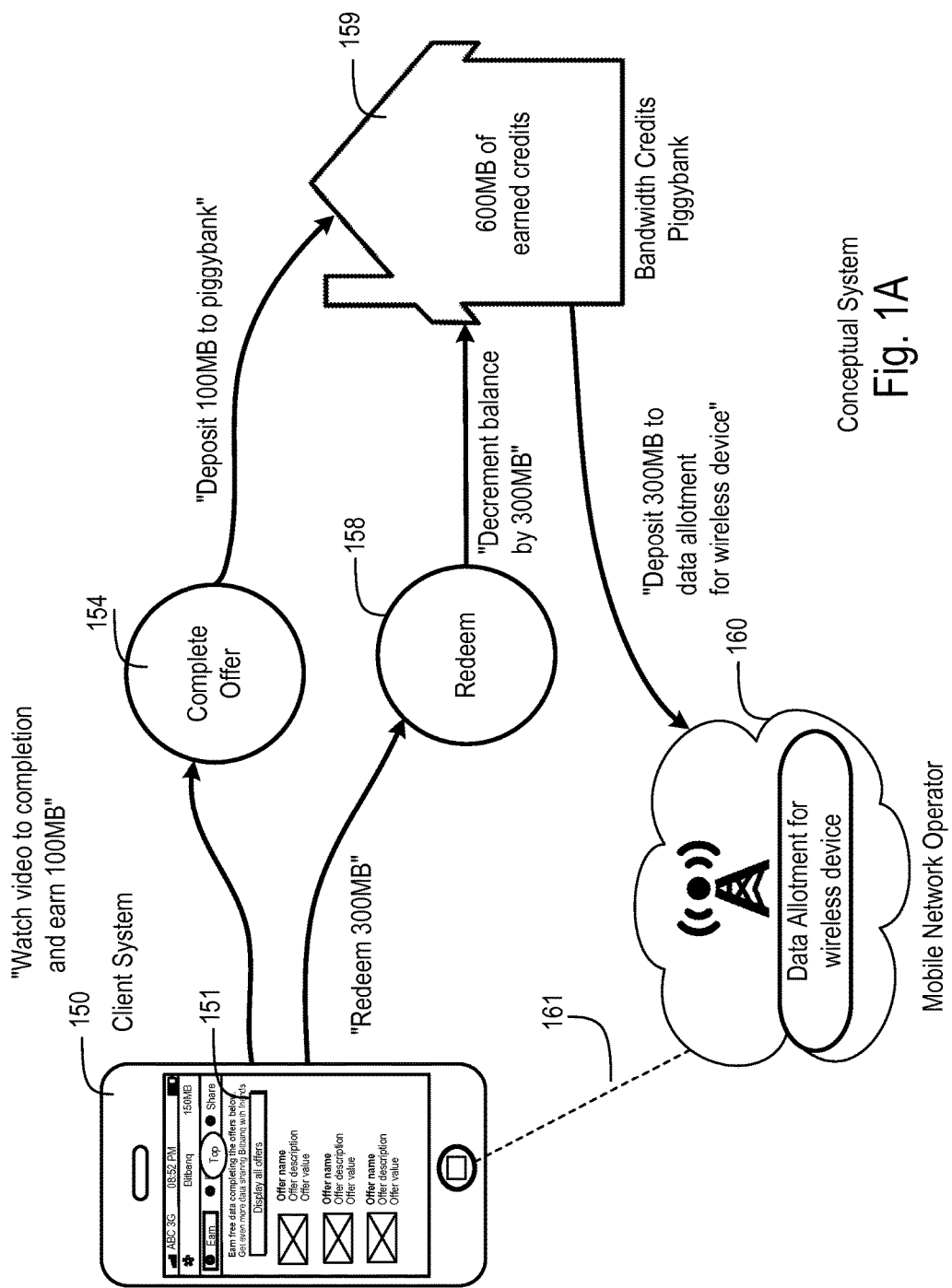
FIG. 1A is a conceptual representation of an example wireless network credit exchange system.

FIG. 1A is a conceptual representation of an example wireless network credit exchange system. A user device 150 running a client system 151 allows a user to earn wireless network credits by completing an advertising offer 154. An example of an offer could be "Watch a video to completion and earn 100 MB". Upon completion of the offer, wireless network credit is deposited into a credit piggybank 159, acting as an escrow account keeping track of all the wireless credit earned using the wireless network credit exchange system. For example, the total wireless credit balance could show 600 MB of earned credits. The user may decide to redeem some of it and apply a portion of the credit to mobile devices linked to the client system, which can include the user device the client system is running on as well as other mobile devices. For example, the user can decide to redeem 300 MB 158 to a mobile device linked to the account, out of a balance of 600 MB, which decrements the earned balance by 300 MB in the piggybank 159. The wireless network credit exchange system is connected to a mobile network operator 160 that runs a wireless network that the mobile device is provisioned on 161. As a result of the redemption, a wireless network credit of 300 MB is credited to the wireless network data plan or allotment associated with the mobile device.

For example, the wireless network credit exchange system may follow a typical client/server paradigm. The systems and processes described below are illustratively applied to offers associated with content items that are advertisements, but the systems and processes are also applicable to other content items provided over a network.

Figure 1B:
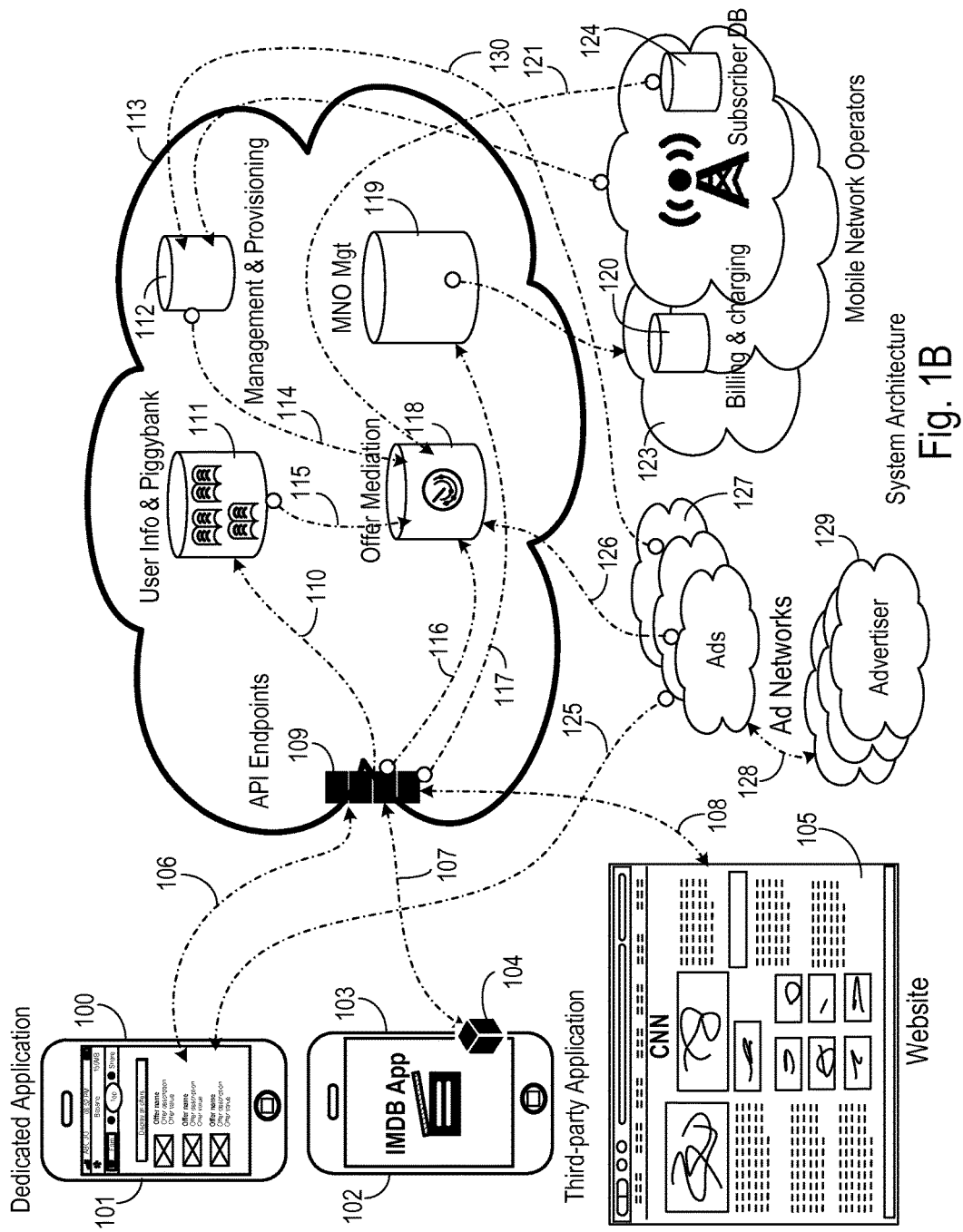
FIG. 1B is a system architecture diagram of an example wireless network credit exchange system.

FIG. 1B is a general system architecture diagram of an example wireless network credit exchange system. Client systems, instantiated as a dedicated application 101 running on a mobile device 100, a third-party application 102 running on a mobile device 103 and including an add-on component 104 packaging the functionalities of the client system, and a website 105, connect and can correspond with the value exchange platform 113 through Application Programming Interfaces (API) endpoints 109 by way of client calls 106, 107, 108. API endpoints allow the subsystems of the value exchange platform to be exposed as standard web services, abstracting their functionalities and providing security as all calls and callbacks between a client system and the value exchange platform are authenticated and encrypted. A possible implementation of such functionalities is to define these API endpoints as REST endpoints and leverage the JSON serialization language encapsulated in secure HTTP (HTTPS) calls to communicate between the client system and the REST endpoints. The value exchange platform 113 is composed of multiple subsystems accessible by the client systems 100, 103, 105. These subsystems may include a user info and piggybank system 111, a management and provisioning system 112, an offer mediation system 118 and an operator management system 119. The user info and piggybank system 111 may be accessible through the API endpoints 109 via a private interface 110, i.e., an interface that is not exposed to systems external to the value exchange platform. That interface can be used to retrieve user account information and interact with the piggybank balance. An internal interface 115 to the offer mediation system 118 is available to allow retrieval of user account information and engagement and conversion statistics from the user info and piggybank system 111. The offer mediation system 118 may be accessible via the API endpoints through an internal interface 116 for the purpose of retrieving an offer wall when requested by the client systems. The offer mediation system 118 may source advertisement offers from multiple ad networks 127 through a dedicated interface 126, i.e., an interface that is not used by any other systems other the mediation system of value exchange platform. Content items (e.g., advertisements or other media files) associated with offers may be communicated to the ad networks via interface 128 and communicated to the client system via interface 125. The offer mediation system 118 interacts with the management and provisioning system 112 through an internal interface 114 that may be used to retrieve the parameters of a value exchange campaign and the redemption policies provisioned by the mobile network operators 123 through interface 123. Additionally the offer mediation system 118 retrieves subscriber information stored in the subscriber data base (DB) 124 of a mobile network operator 123 via a private interface 121. The operator management system 119 may be reachable from the API endpoints 109 via a private interface 117 for the purpose of verifying eligibility and applying redemption onto the subscriber's balance. The operator management system 119 may interact with the billing and charging system 120 of the mobile network operator network 123 through a private interface 122.

Client System:

The client interface presents wireless network credit earning opportunities to users. In some implementations, the client interface keeps track of earned credits in a locally cached piggybank, that is, a synchronized copy of the credit balance for the user account that is maintained server side. Via the client interface, a user can link one or more personal mobile data plans. The one or more mobile data plans may be registered to one or more mobile devices. A linked mobile data plan is authenticated and authorized as one of the valid plans to redeem earned credits. A series of security mechanisms can be used to verify the device belongs to the user linking it in the client system. For example, the software routine can check that the phone number (also known as MSISDN, short for Mobile Station Integrated Services Digital Network in the telecom industry) matches the number reported by the operating system running on the device. Other unique wireless network device identifiers (e.g., a Medium Access Control address) could also be used for verification purposes. In the absence of such capability, the software routine can trigger a check from the server-side platform. The check can include sending a Short Message Service (SMS) message to the device with a numeric short code which the user needs to enter to finalize linking the device and the associated mobile data plan to the client system. The client interface may also be used to initiate the redemption of credits from the piggybank (an account storing a balance of earned wireless network credit) to the mobile data plans linked to the user account. When credit redemption is initiated, a user may be enabled to redeem to pre-registered data plans in a single step.

Figure 2:
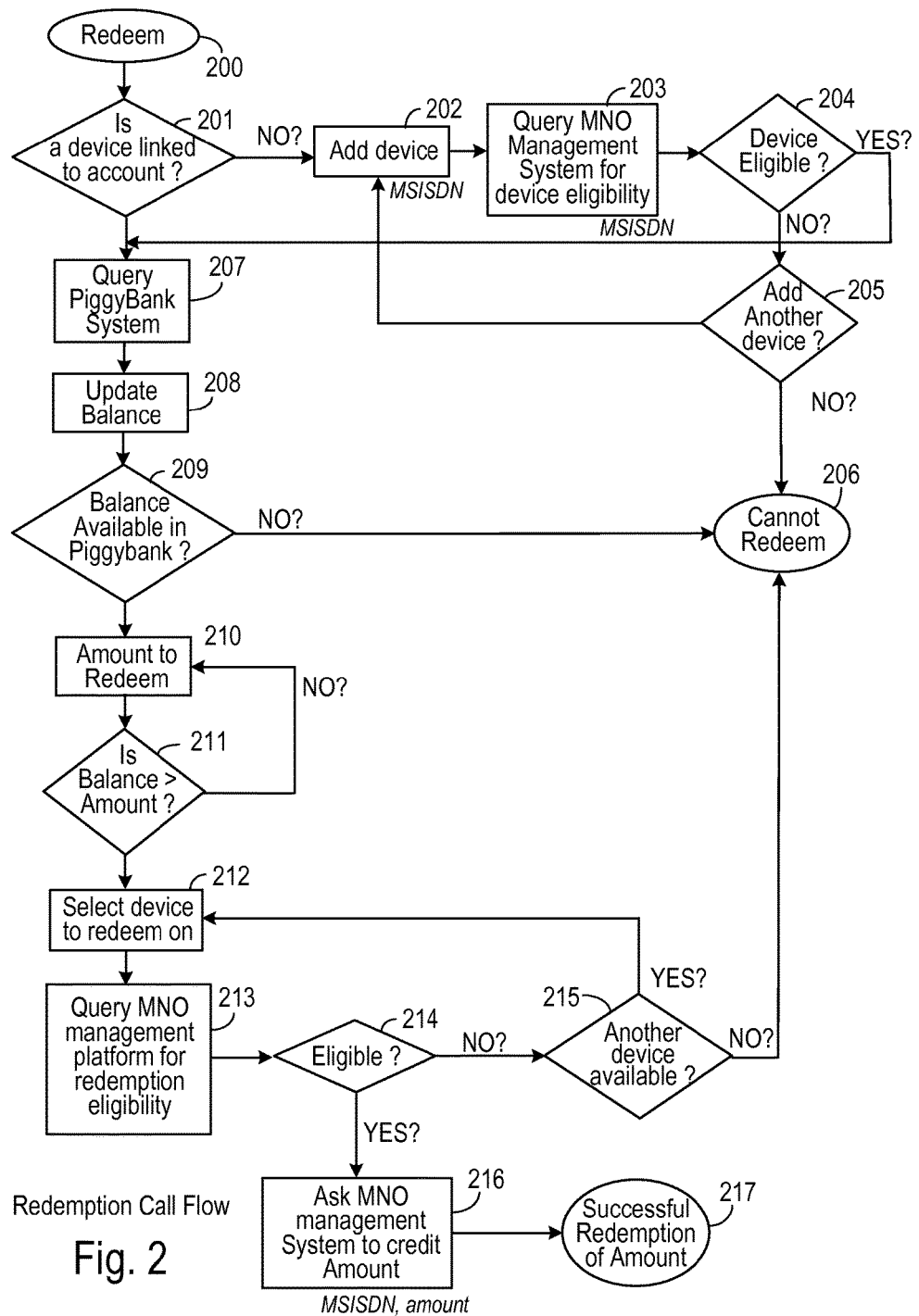
FIG. 2 is a call flow of an example process for wireless network credit redemption.

FIG. 2 presents a call flow for an example redemption process. On the logical step of redeeming a wireless network credit 200, the client system verifies 201 that at least one device is linked to the account to redeem wireless network credits on. If no device is linked, the client system asks the user to add a device 202, which may include requesting the MSISDN of the device. The MNO management system is queried to verify that the device associate with that MSISDN is eligible for the service 203. If the device is not eligible, the client system proceeds to ask the user to enter another device 205. If the user chooses not to add another device, a "cannot redeem" message is presented to the user 206. If the device is eligible 204 or an existing device is present 201, the client system queries the piggybank system 207 and updates the local available wireless network credits balance 208. If a balance is not available 209 (e.g. no wireless network credits), a "cannot redeem" message may be presented to the user 206. If a balance is available 209, the client system asks the user to enter the amount to redeem 210. If the balance is less than the amount 211, the user may be asked to reenter a different amount. If the balance is more than the amount 211, the user is asked to select the device it wishes to redeem for 212, out of a list of devices linked to the account. Once the device is selected, the MNO management system may be queried to verify that the device associated with that MSISDN is eligible for redemption of wireless network credit 213. If it is not eligible 214, the users may be asked to select a different device 215. If no other device is available or the user chooses not to proceed, a "cannot redeem" message may be presented to the user 206. If the selected device is eligible 214, a call is made into the MNO management system 216 to instruct it to credit the amount towards the data plan of the selected system, on the wireless network provider's network that the device is provisioned on. A successful redemption message may be displayed to the user 217.

Figure 4A:
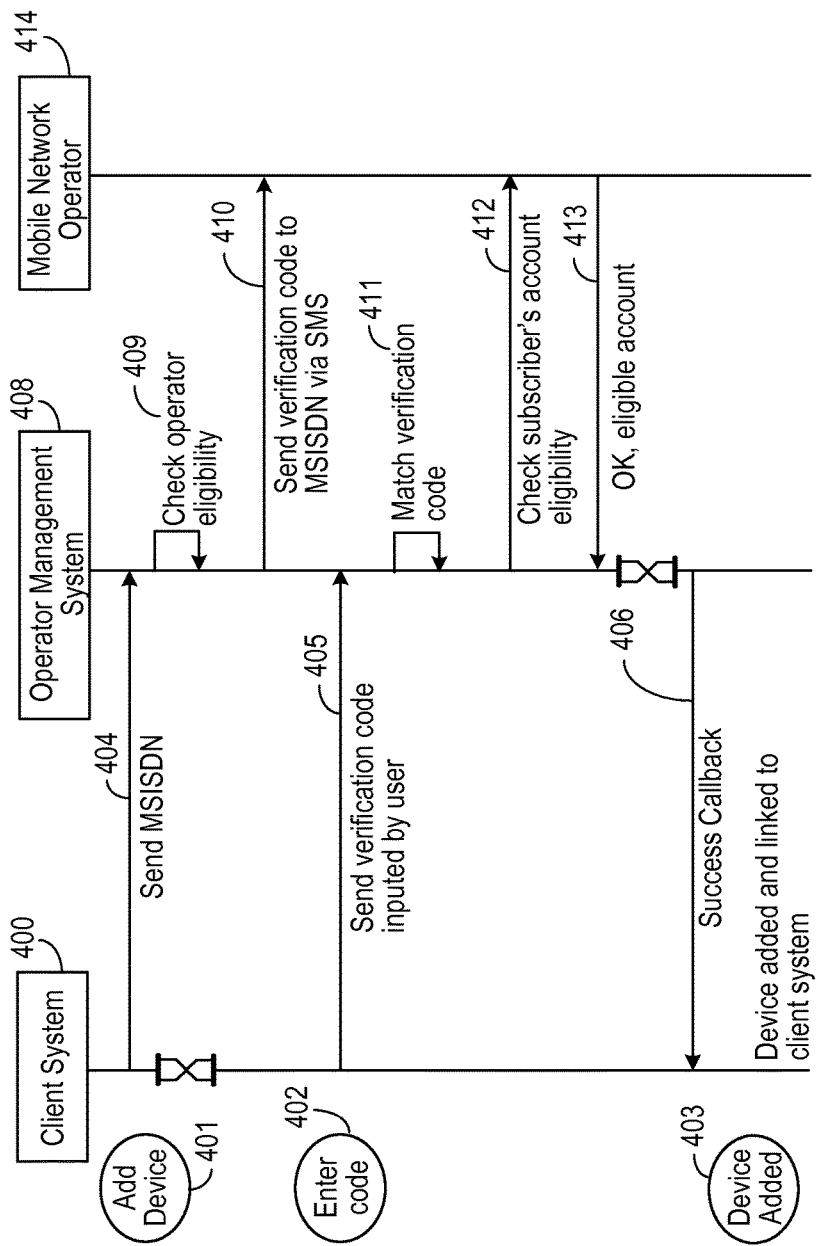
FIG. 4A is a sequence diagram describing signaling for an example session to link a device to a client system for redemption.

FIG. 4A is a sequence diagram describing signaling for an example session to link a device to a piggybank account to allow for redemption. Generally, the client system 400 communicates with the operator management system (OMS) 408, which communicates with a mobile network operator 414. For the logical step of adding a device 401, a query 404 including the MSISDN identifier of the device being linked is made to the OMS 408. OMS 408 may perform an internal operator eligibility procedure 409 to determine if the device is eligible (for instance, a mobile network provider may decide that only a subset of the devices available on their network are eligible for the wireless network credit redemption service); and proceeds with sending a random verification code in a message 410 that passes through the mobile network operator's (MNO) 414 wireless network (e.g., via SMS (Short Messaging System), by leveraging commercial SMS gateways) to the device identified by the MSISDN. Upon receiving the SMS message 410, the logical step 402 of entering the verification code may be initiated. The verification code is then sent to the OMS 408 via call 405. In some implementations, the OMS 408 initiates an internal verification procedure 411 to match the code sent in 405 of the verification code generated and cached locally. Upon a match, the OMS 408 may initiate a subscriber's data plan eligibility check (for instance, a mobile network operator would want to ensure that the subscriber's data plan is active and in good standing) 412 with the MNO 414. Upon receiving a validation message 413 verifying the eligibility, the OMS 408 may issue a success callback 406 to the client system 400 and the logical step 403 of linking the device to the client system 400 is achieved.

FIG. 9A-D are a sequence of screenshots describing an example client UX for a user linking a device to client system for redemption. A client system instantiated as a dedicated mobile application 901 running on a mobile device 900 presents a settings pane 902 where user can manage the devices linked to an account 903. A user initiates the process of linking a device by invoking a "add device" 905 button that presents a secondary pane looking for additional input about the device, e.g., a device name 906 and device phone number 907 (also known as MSISDN). Upon validation 908, the device is added to the list of linked device but needs to be verified 909. The MNO management system upon verifying eligibility will send a verification code to the mobile device 900. Upon receiving the mobile code 911, the user may input it in a 910 field and validate the operation 913. The verification code 912 is transmitted to the MNO management system. Upon validation, a success message 914 may be displayed to the user.

Figure 4B:
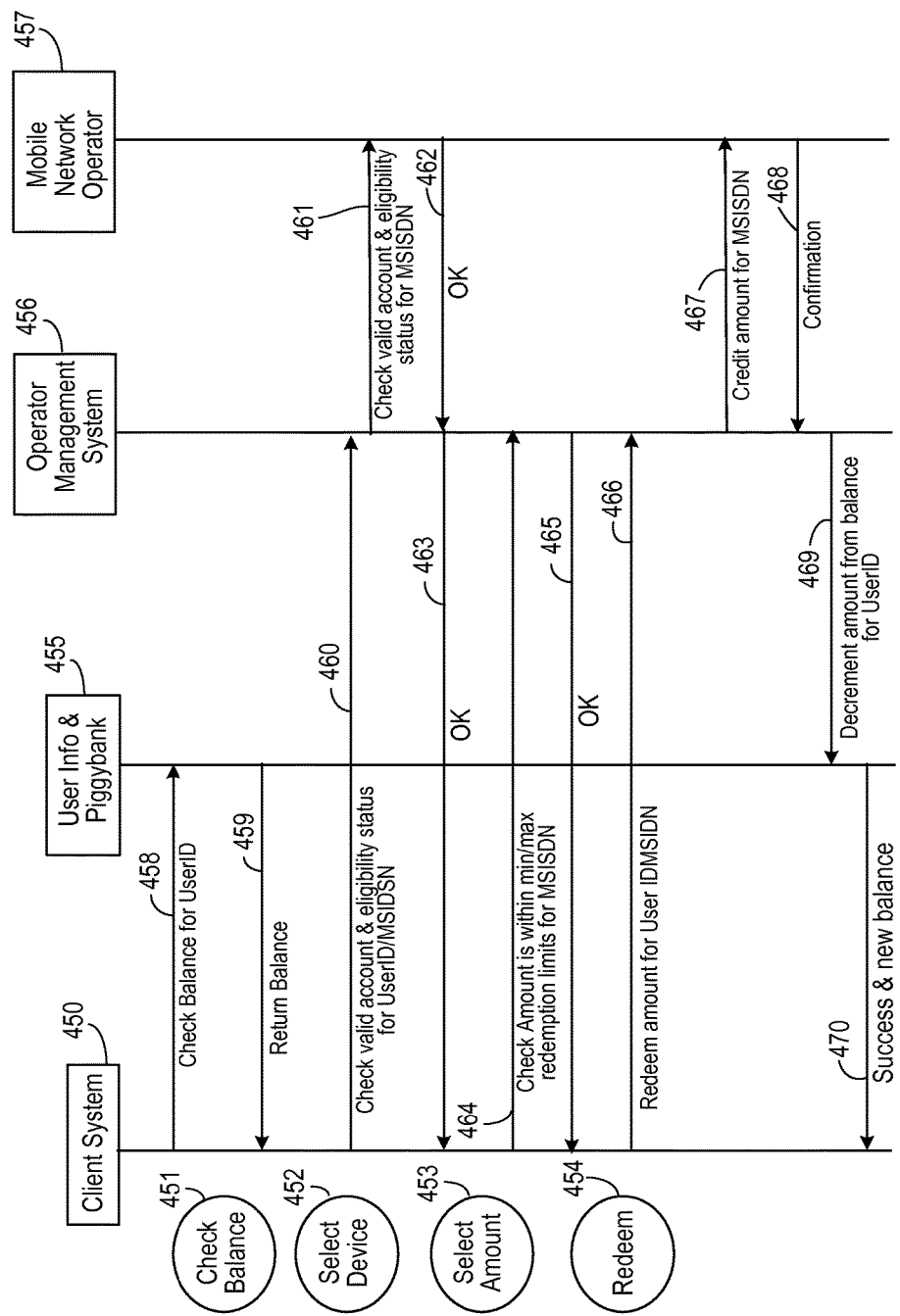
FIG. 4B is a sequence diagram describing signaling for an example session to redeem a wireless network credit.

FIG. 4B is a sequence diagram describing signaling for an example session to redeem wireless network credit onto a mobile data plan of a device linked to a client system. Generally, the client system 450 communicates with a user info and piggybank system (UIPS) 455 and operator management system (OMS) 456 that communicates with a mobile network operator (MNO) 457. For the first logical step 415 of checking the balance, a check balance call 458 passing a userID may be made to the UIPS 455 and a balance amount may be returned in step 459 to the client system 450. In a following logical step 452, the user may select a device to redeem on. The client system 450 makes a call 460 to the OMS 456 to check that the data plan is valid and eligible for redemption, passing a userID and MSISDN. The OMS 456 may issue a call 461 to the relevant MNO 457 to check the data plan and eligibility status for the MSISDN. Although the device is already linked, that step may be useful to ensure that the data plan is still eligible (for instance, the data plan may have been in good standing at the time of the original linking and fallen out of status, therefore not eligible anymore). Upon receiving a validation answer 462 from the MNO 457, the OMS 456 issues a proceed call 463 to the client system 450. The next logical step is for the user to select an amount to redeem 453, which may trigger a validation call to the OMS 456 to check whether the amount entered is within the min/max redemption limits for that MSISDN. A proceed call 465 in response from the OMS 456 clears the path for the redeem logical step 454. A redeem call 466, passing the userID and MSISDN is issued to the OMS 456, which proceeds with a credit call 467 containing the credit amount and the MSISDN to the MNO 457. Upon receiving a confirmation call 468 from the MNO 457 to the OMS 456, the OMS 456 informs the UIPS 455 with a decrement amount call 469 containing the userID. Once the balance is decremented the UIPS 455 may return the updated balance to the client system 450 with a success and update balance call 470.

Figure 8A:
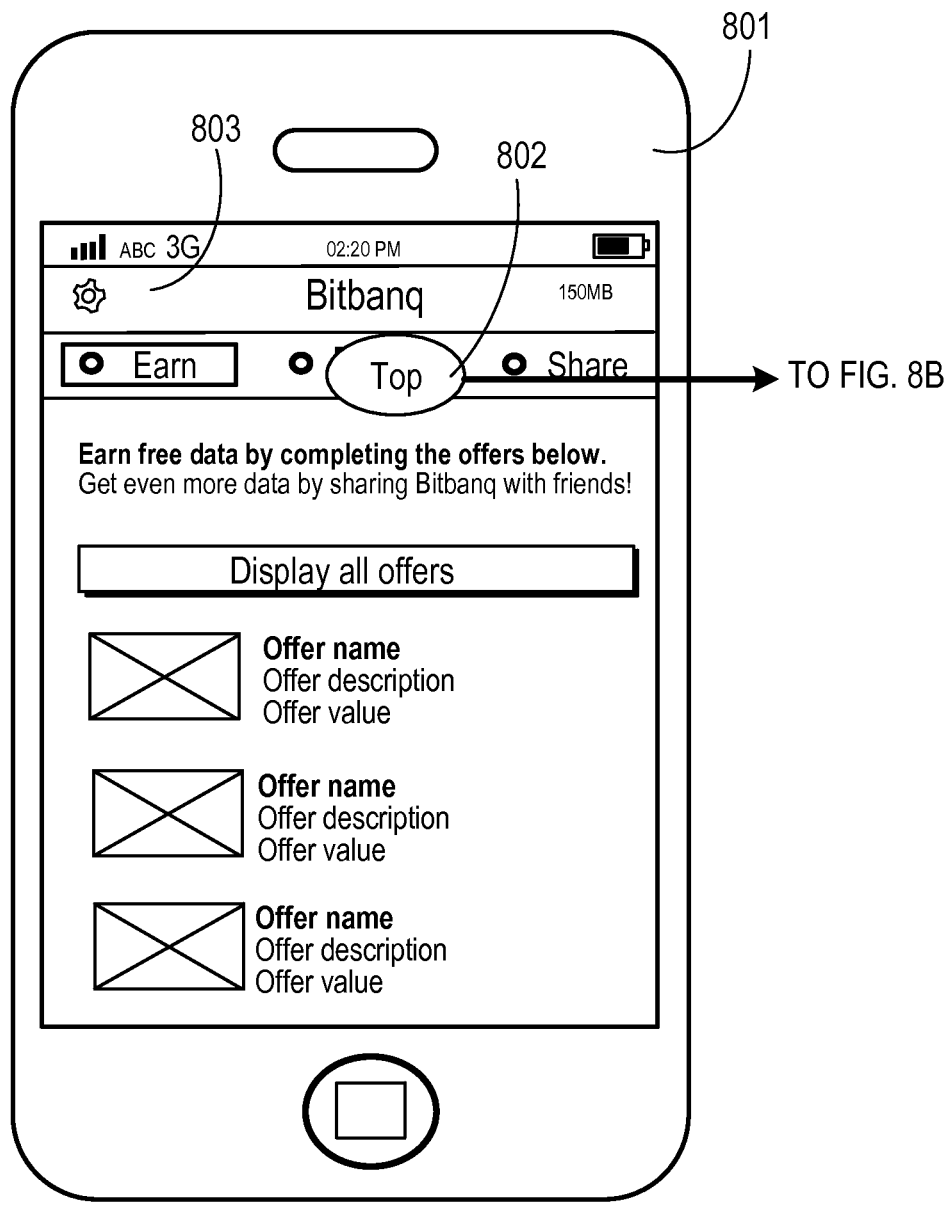
FIG. 8A-C are a sequence of screenshots describing an example client UX for a user redeeming wireless network credits onto a mobile data plan for a client device.
Figure 8B:
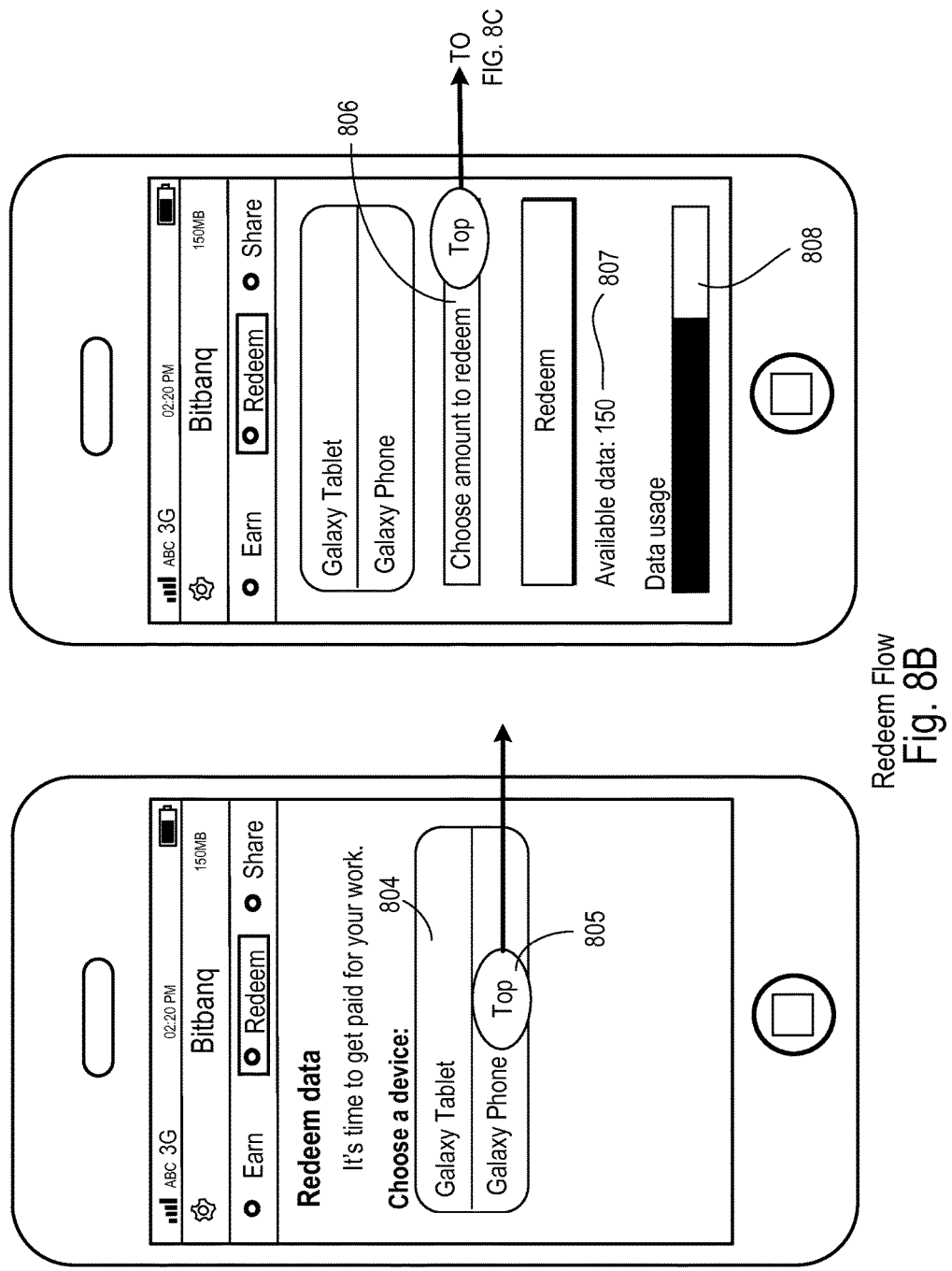
Figure 8C:
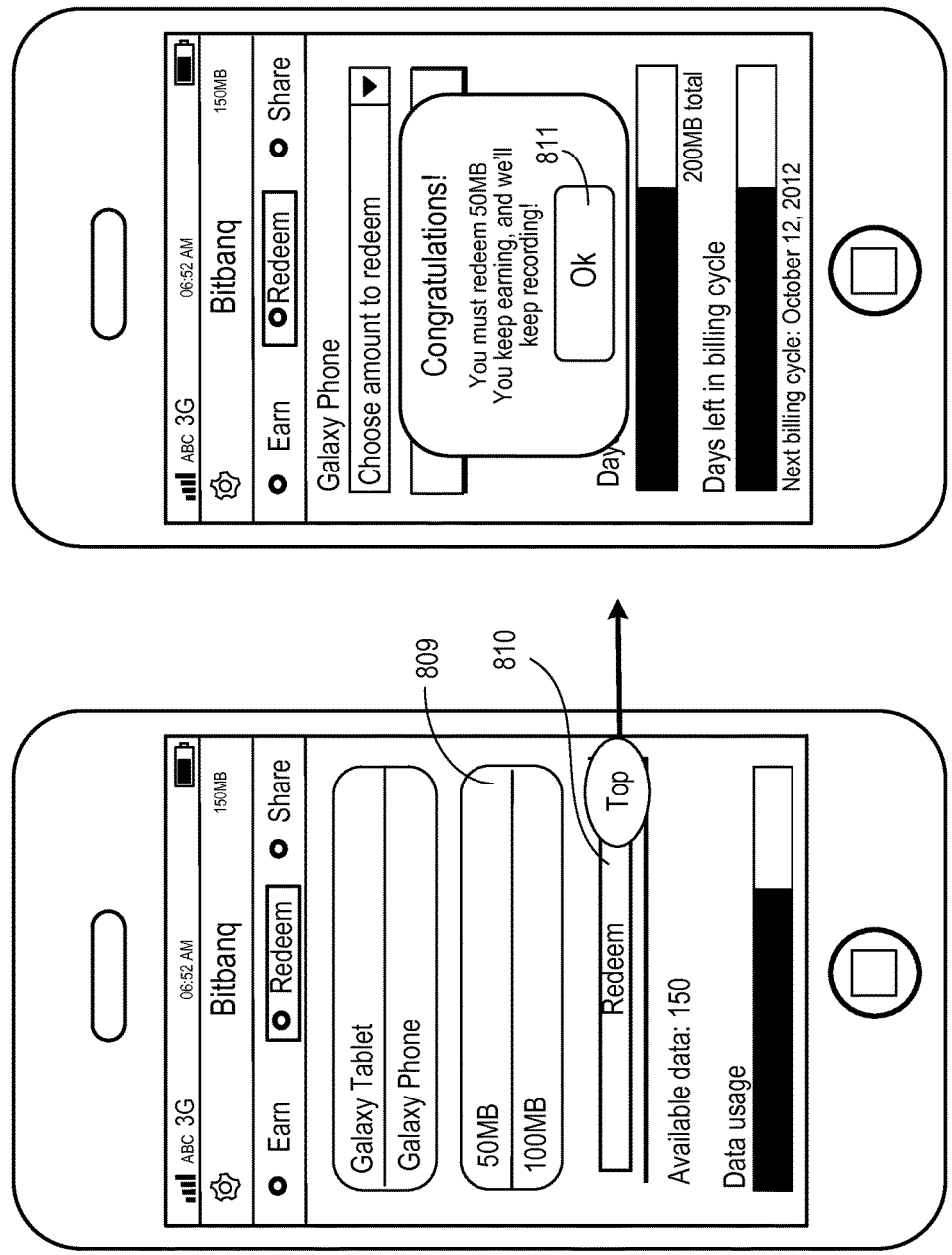
Figure 9B:
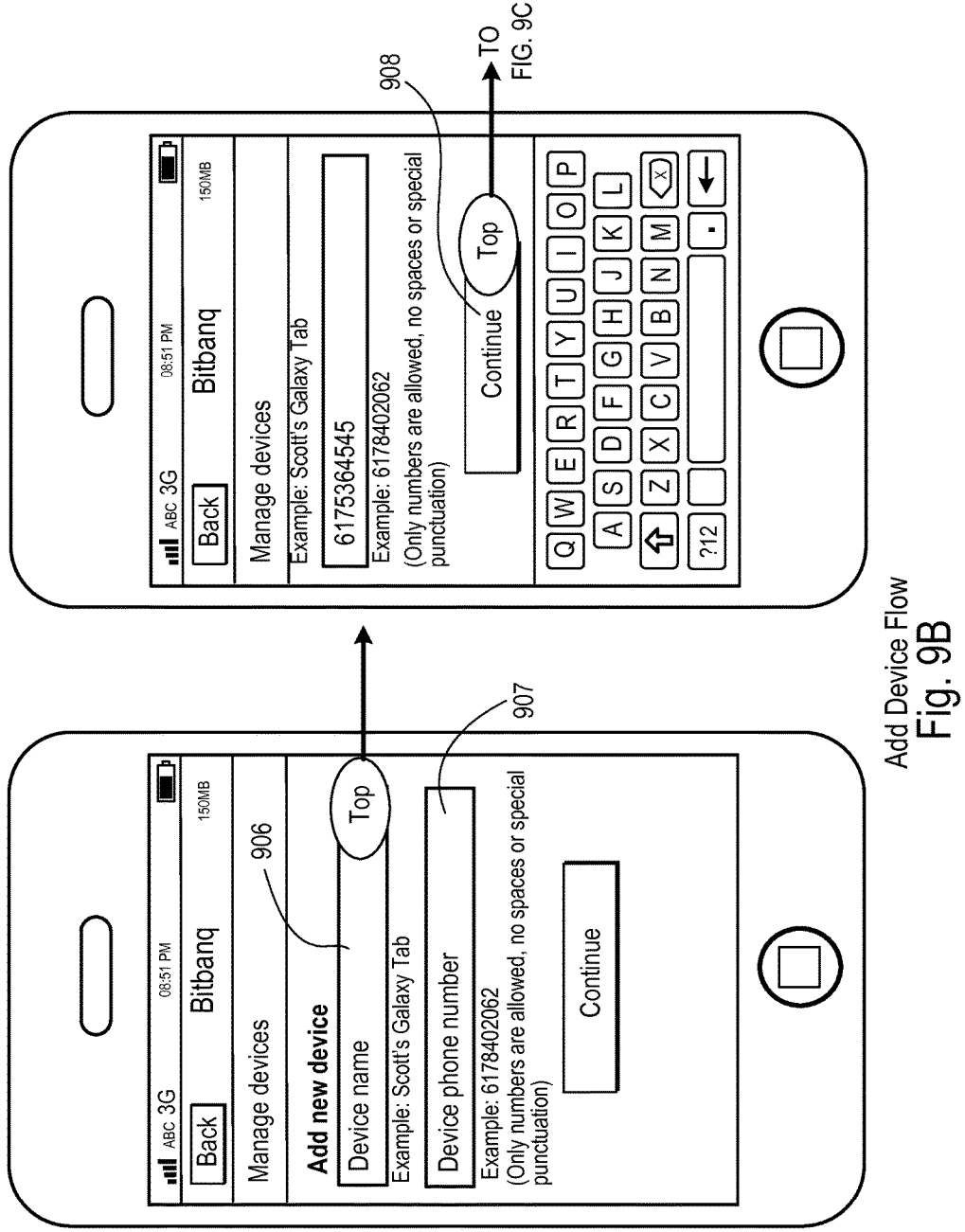
Figure 9D:
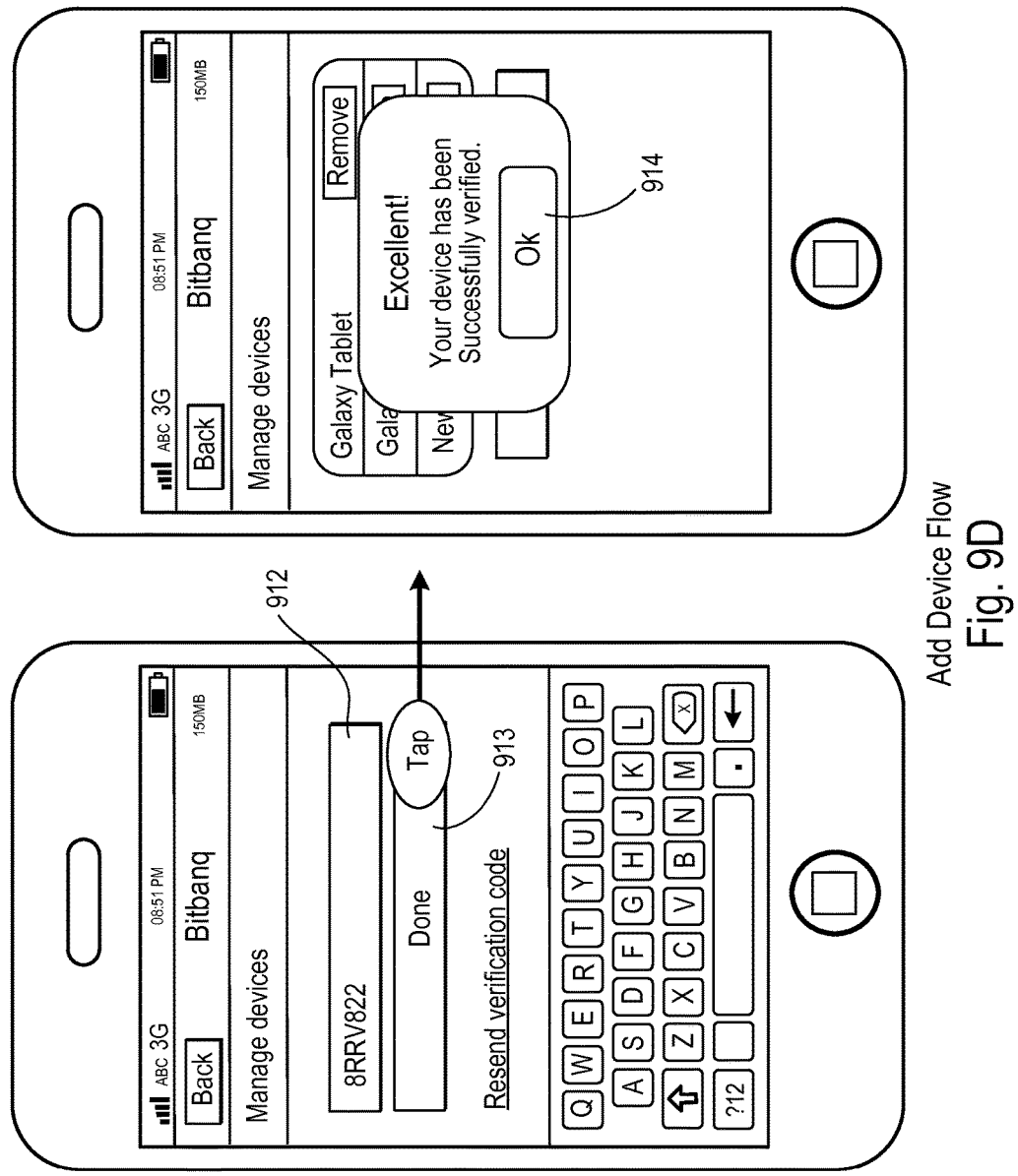
Figure 10A:
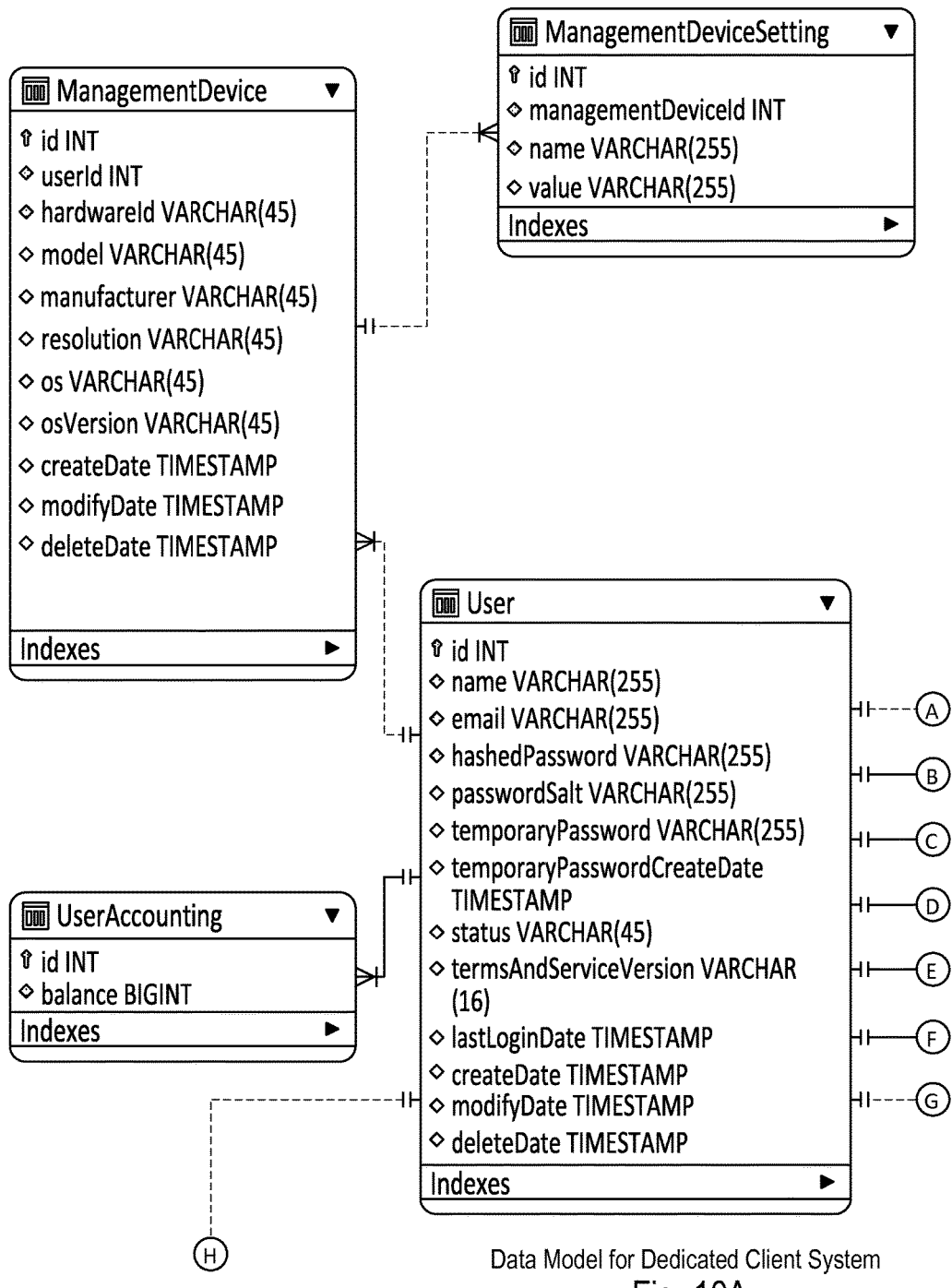
Figure 10B:
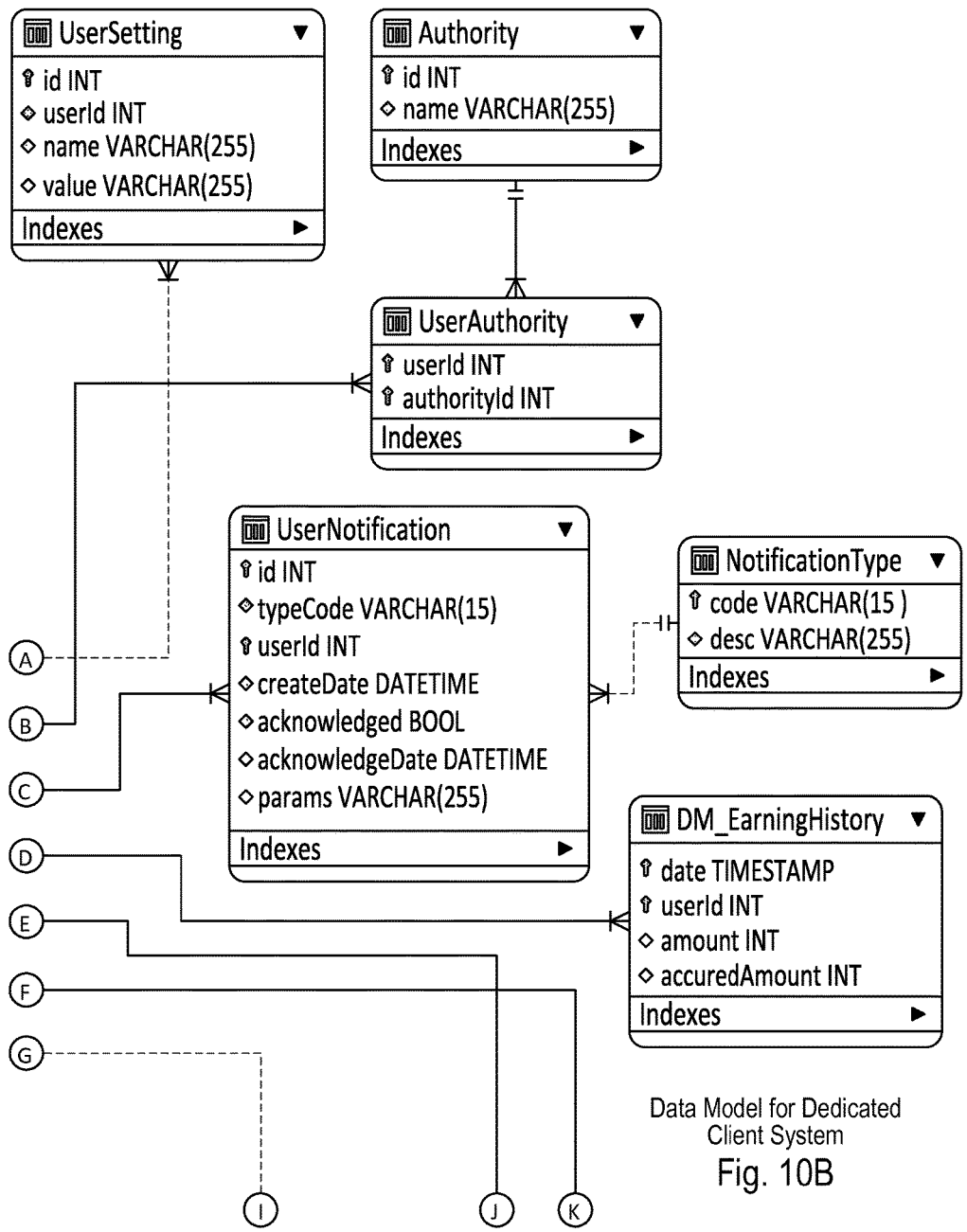

FIG. 8A-C are a sequence of screenshots describing an example client UX for a user redeeming wireless network credit onto a mobile data plan for a client device. A client system instantiated as a dedicated mobile application 803 running on a mobile device 801 presents an earning pane displaying offers. Upon selecting the redeem option 802, the user is presented with a redeem pane, showing a list of devices 804 linked to the user account that can be used to redeem earned wireless network credits. Upon selecting one of the devices 805, the user may be presented additional information, including an input mechanism to select an amount to redeem 806, an information panel indicating of the balance available in the piggybank 807 and a usage panel indicating the data usage level for the data plan the selected device is on. Upon selecting an amount to redeem 809, the user confirms the transaction by hitting a redeem button 810. A successful transaction message 811 may be displayed to the user.

The client interface may include a social framework allowing users to connect the application to the social networks they participate in. Examples of such social services include Facebook and Twitter for instance. These services publish Application Programming Interface (API) capabilities for third-party services and applications to authenticate, retrieve social graph information, and generally interact with the functionalities offered by these services (e.g., post a message on a user's Facebook wall, send a tweet to Twitter on behalf of a user). The social framework may abstract the interaction with the various social networks and normalize the differences between their respective data models. For example, the social framework could retrieve the social graph for the same user on both Facebook and Twitter as well as the local address book on the user device and consolidate it into a single graph, pruning duplicates and normalizing the data models used.

The social framework allows users to share their achievements on social networks and earn additional wireless network credit for sharing, engaging and recommending the system to their social connections. The social frame also enables the gifting of mobile data broadband earned and stored in a virtual piggybank between a user and their social connections.

FIG. 13A-E are a sequence of screenshots describing an example client UX for a user earning wireless network credit for sharing and interacting with social networks. A client system instantiated as a dedicated mobile application 1314 running on a mobile device 1300 presents a sharing panel 1302 offering various options for a user to earn additional wireless network credits for sharing the application to other subscribers. Sharing can include recommending the system client to contacts and inviting them to sign up for the service. Multiple sharing options are presented, including sharing to address book entries, sharing to various social networks, sharing via email or sharing via text message. An interesting example of sharing to address book entries can be initiated by selecting the option 1301. The client system 1314 looks up the address book stored on the device 1300 and presents the user with the options of sharing with all eligible contacts 1304 and sharing to specific contacts 1305. Contacts may be eligible a phone number (MSISDN) included in the contact information is eligible for the service provided by the value exchange platform. For example, a device may be eligible for service if the wireless network on which the mobile device is provisioned can be integrated with the MNO management system. If the user decides to share with all eligible contacts 1304, the client system 1314 may automatically send an email to all eligible contacts and the user may be notified of the action 1306. If the user decides to choose specific contacts, the user may be presented with a list of all eligible contacts 1307. Sharing with one of those contacts 1309 may present the user with the options of sharing by email 1308 and of sharing by text message 1310 to the eligible phone number in the contact information for the selected contact. Upon sharing by text message, the user may be notified with a success message 1313. If the user decides to share via email 1308, the user may be prompted to enter or select an email address 1311 and proceed with the sharing 1312. Upon sharing by e-mail, the user may be notified with a success message 1315.

The client interface can optionally include the monitoring of balances, billing cycles and usage information for the mobile data plans linked to it. In addition to the convenience afforded to a user, the added awareness enables the client interface to perform smart operations on behalf of the users. The client interface can monitor the data usage and runs statistical analysis and heuristics on it in order to forecast when a mobile plan will be depleted and make recommendations to the users on much and when to use available credits in the piggybank based on the available balance, to avoid overage charges and wasting credits. For example, a statistical analysis may include compiling usage patterns for a collection of subscriber data plans with similar subscriber demographics and using similar devices and using historical data to determine the likelihood that the current subscriber's data plan will be depleted before the end of the billing cycle. For example, a heuristic may include collecting usage pattern data on the current subscriber and determining that over time, weekend days are 50% more intensive than week days and analyzing the type of days before the end of the billing cycle against the data usage left in the data allotment. In some implementations, redeemed credits that are unused at the end of the billing cycle can be flushed by the mobile operator. Additionally, users can define triggers and threshold preferences for each of their mobile data plans or put the client system in full autopilot mode, i.e., letting the client system determine the best strategy to replenish linked mobile data plans with credits available in the piggybank.

FIG. 10A-D is an example data model used by a dedicated client system. The client system data model may be used by the client system to efficiently store and access data used to implement the techniques described in this specification.

The client system can be instantiated in different ways depending on the use case.

In some implementations, the client interface includes a dedicated mobile application. The mobile application allows mobile users to view their current mobile data plan information and get a usage summary of their mobile consumption in real-time. The mobile application may also permit earning wireless network credit in exchange for completing engagement offers, achieving in-app milestones or watching advertisements. The mobile application allows users to manage and monitor the virtual piggybank and configure policies and preferences for the redemption of earned credits across any of the mobile data plans linked to the piggybank account.

Figure 14:
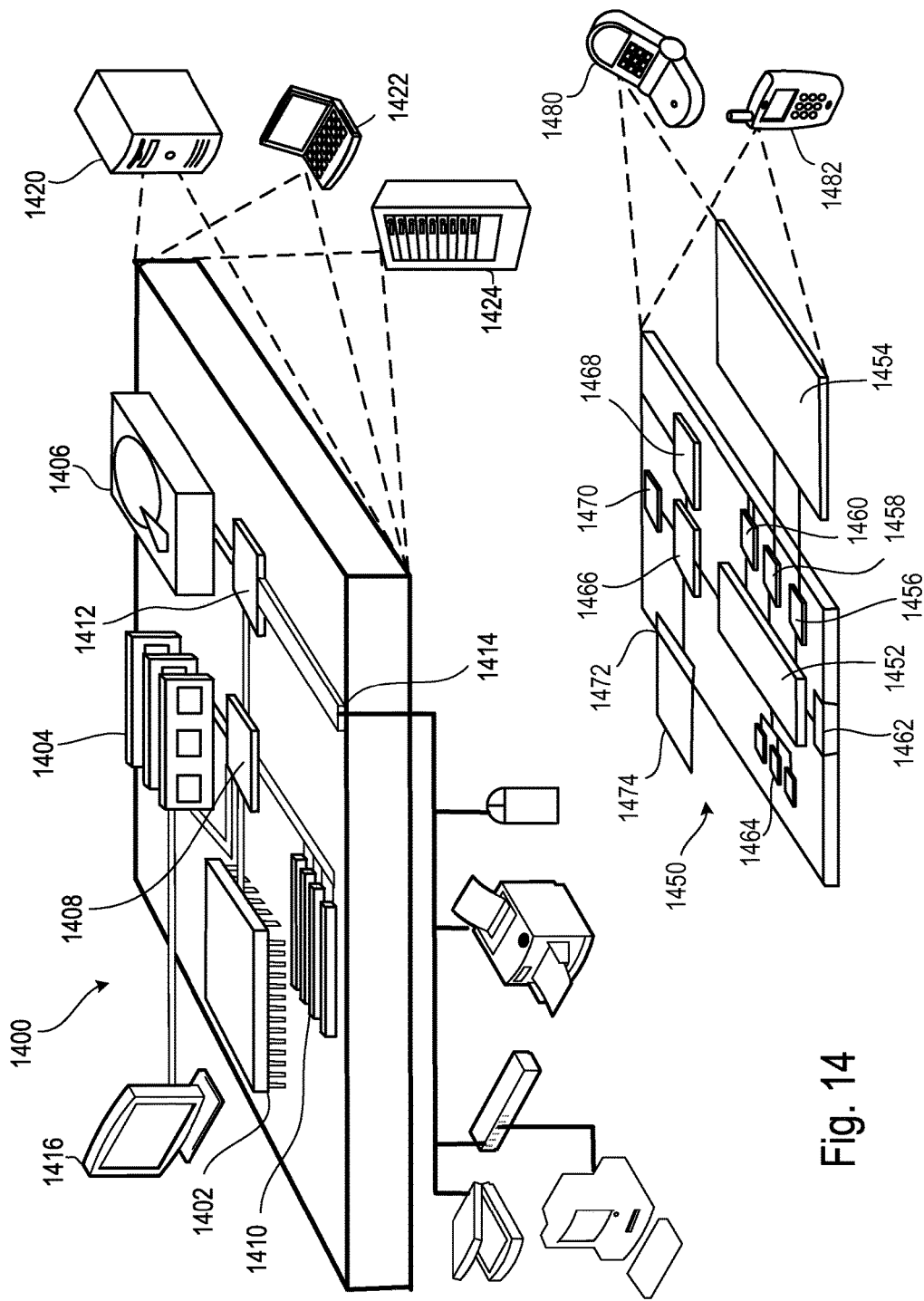
FIG. 14 shows an example of a computer device and a mobile computer device that can be used to implement the techniques described here.

For example, the client system as a dedicated mobile application 101 may be implemented as software, hardware or a combination of software and hardware that is executed on a processing apparatus, such as the mobile computing device 1450 illustrated in FIG. 14.

Figure 3:
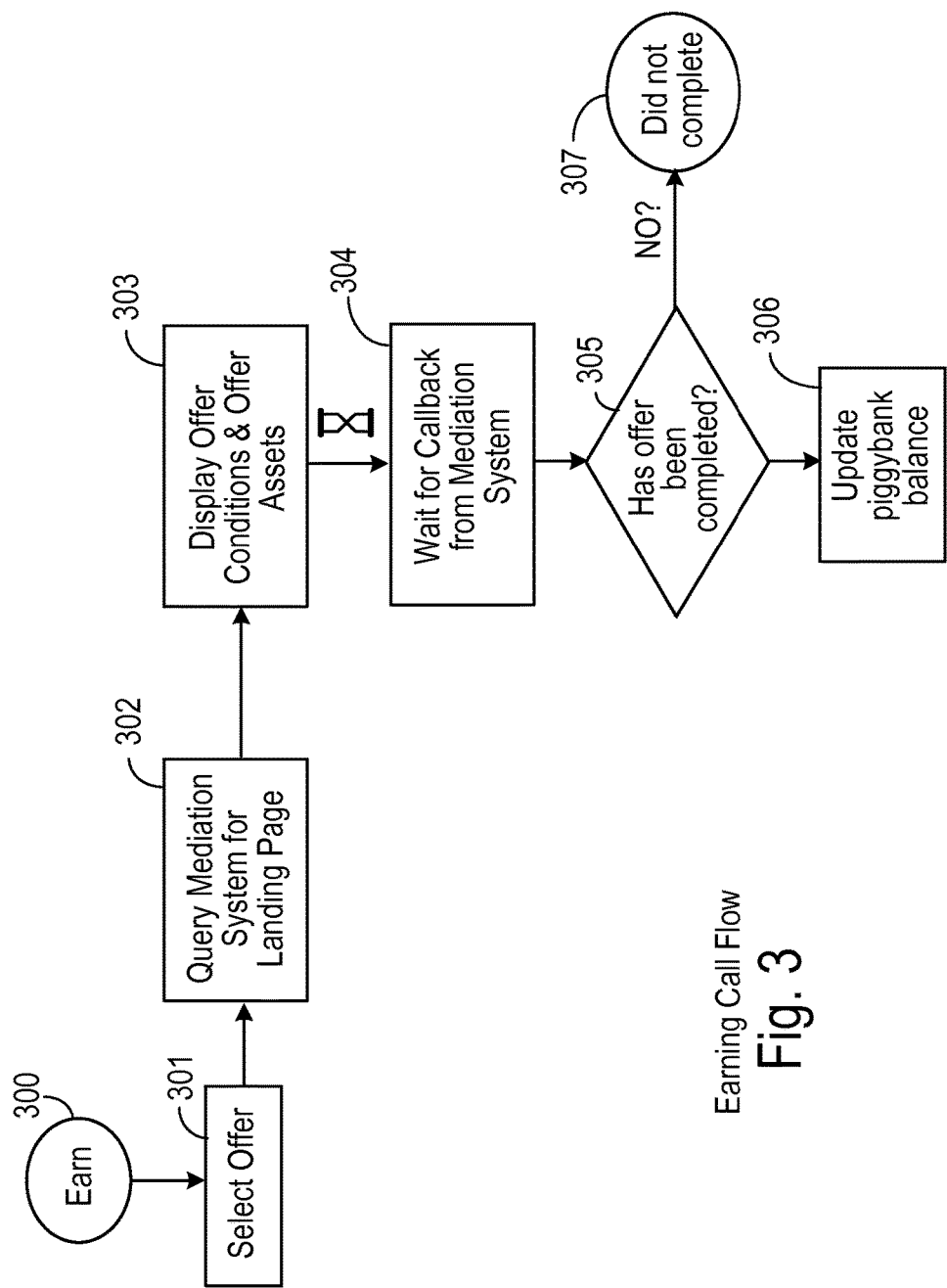
FIG. 3 is a call flow of an example process for earning wireless network credit.

FIG. 3 is a call flow of an example process for earning wireless network credit. On the logical step of earning a wireless network credit 300, the user selects an offer 301 out of all the offers presented by the client system. Upon selecting that offer, the mediation system is queried to retrieve the content item (e.g., an advertisement, web form, a video, a landing page, etc.) associated with the offer 302. The content item is displayed and may describe the conditions and parameters of the offer 303 and include the assets related to the offer if any (e.g., if the offer is a video offer for which upon a completed watch, the user is rewarded wireless network credits, the video would be displayed in 303). Upon completing the offer, the client system may wait for a callback confirmation from the mediation system 304, indicating whether the offer was not successfully completed or not 305. If the offer was completed, the piggybank balance may be immediately credited with the wireless network credit corresponding to the offer 306. If the offer has not been completed 305, a "did not complete offer" message may be displayed 307 and the user may be redirected to the display of the content item for the offer 303.

FIG. 5 is a sequence diagram describing signaling for an example session to earn wireless network credit by completing an offer on a client system. Generally, the client system 500 communicates with a mediation system 504 that communicates with an ad network 505, which communicates with an advertiser 506. Upon the logical step 501 of clicking on an offer, a query offer page call 507 passing the offerID is made to the mediation system 504. The offer page contains the details of the offer (including information for the bandwidth reward to be earned) and what action the user needs to perform to complete the offer. Upon receiving a call 507 with the offerID, the mediation system may query the ad network 505 with a call 508 for the offer page details, which is relayed to the advertiser 506 with a call 509 to query offer assets (e.g., an advertisement) for the content item that will be displayed to the user. The content item is the secondary layer of an offer. For instance, if an offer is to fill out a survey, the content item will be the survey questions with the proper branding and a means to submit the answers. Upon receiving the assets, the ad network 505 may build the content item. For example, the ad network 505 may assemble the conditions of the offer, including the assets required for completion into a format that can be read by the client system 500 (e.g., an HTML page can be used). The content item may contain one or more trackers, e.g., a callback software code that triggers an action (such as calling a tracker portal) when the action related to the offer is performed. For example, if the offer is related to watching a video to completion, once the video player ends, the tracker may call the tracker portal. The content item may be sent by the ad network 505 to the mediation system 504 via a call 516, which relays it to the client system via a call 517. At which point, the logical step of displaying the content item 502 may be performed by the client system 500. Once the action tracker is received 519, the advertiser 506 may notify 513 the ad network 505 with a notification of offer completion for offerID, at which point the ad network 505 triggers a success callback 512 for offer ID to the mediation system 504 which notifies 511 the client system 500 that the offer has been successfully completed and the reward should be earned. The reward may subsequently be added to an account in the piggybank system by the offer mediation system syncing rewards by transaction ID for MSISDN.

Figure 7A:
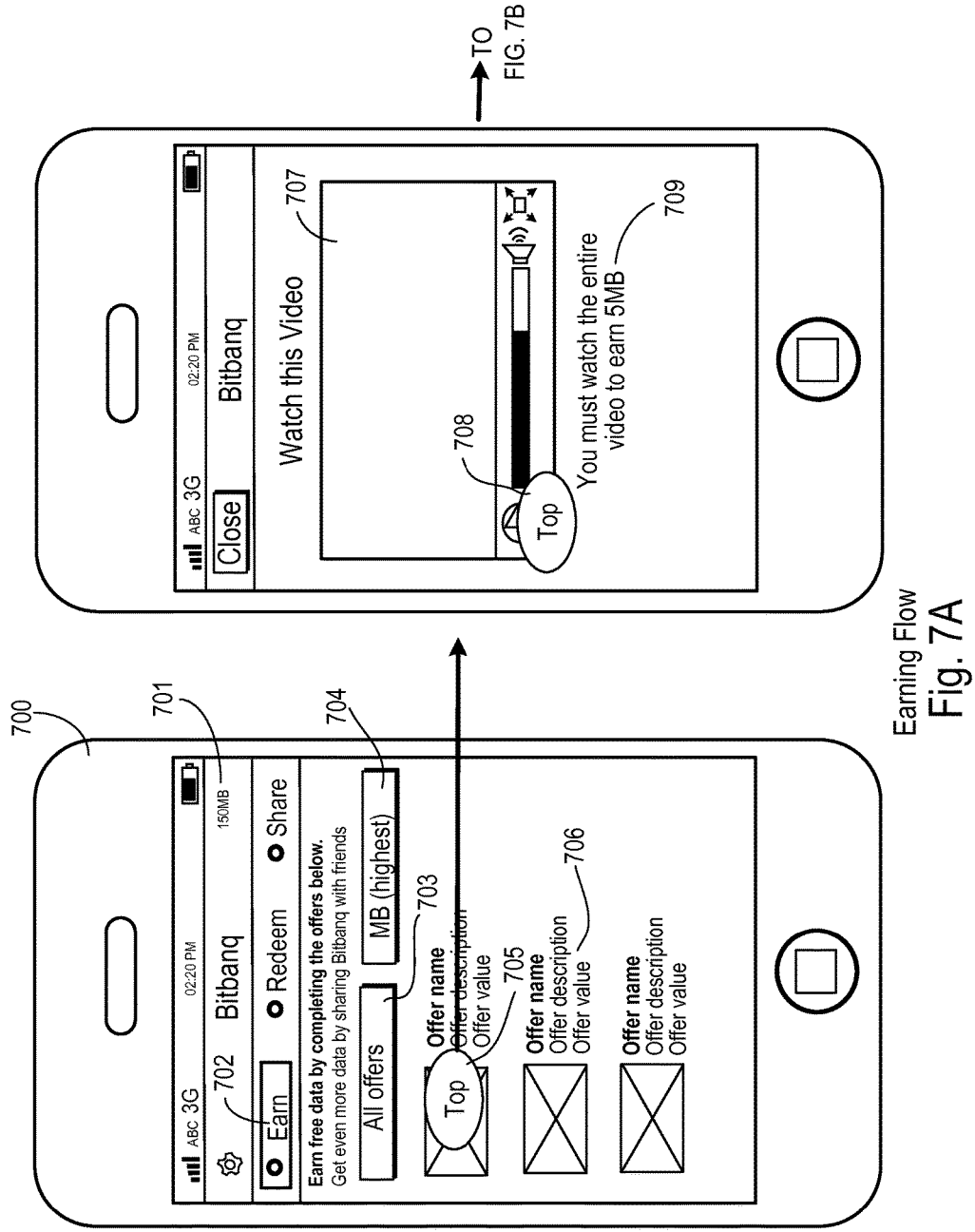
FIG. 7A-B are a sequence of screenshots describing an example client user interface for a user earning wireless network credits on a client system.
Figure 7B:
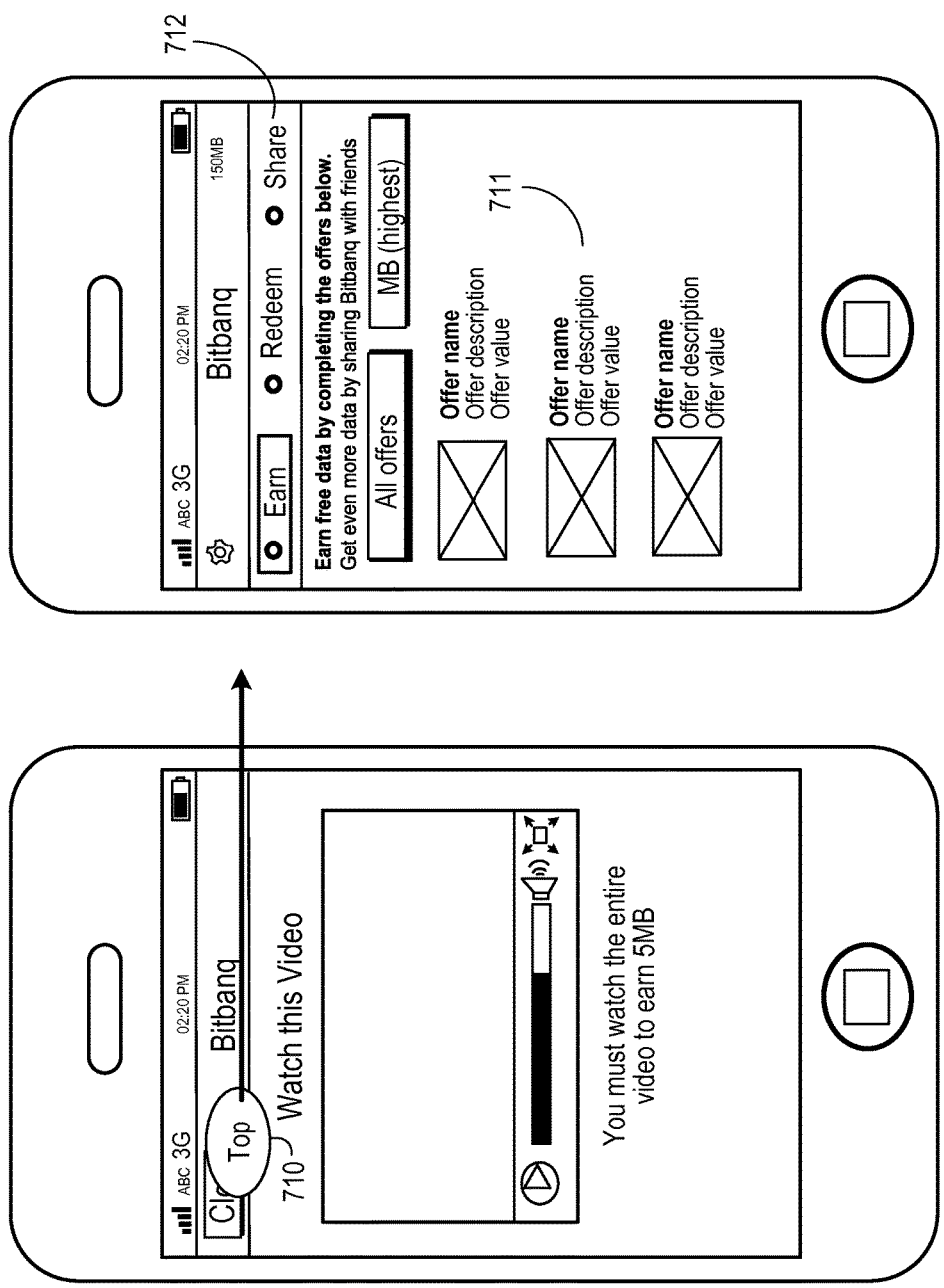

FIG. 7A-B are a sequence of screenshots describing an example client UX for a user earning wireless network credits on a client system. A client system instantiated as a dedicated mobile application 701 running on a mobile device 700 presents an earning pane (e.g. "the offer wall") 702, showing a list of offers 706 and options to restrict offers only to the highest earners 704 or switch back to showing all the offers available 703. Upon selecting an offer 705, the user is switched a view presenting the offer assets (for instance a video 707 in the representation) and the conditions of the offer 709. In this example, starting the video player 708 will start the offer completion process. A close button 710 is available should the user decides to not go forward with the offer. Upon completion of the offer, the user is returned to the offer wall view 702, showing an updated list of offers and showing an incremented balance 712 of wireless network credits in the piggybank.

In some implementations, the carriage (bandwidth) related to the user usage of the application (seeing, engaging and completing an offer as well as redeeming credits) is zero-rated, that is, the user is not being charged for the usage and/or it does not count towards the data allotment. Zero-rating traffic can be effectively achieved in multiple ways, via the operator management system described hereinafter.

Real-time crediting: In some implementations, the client system keeps counters on the usage consumed for interacting, engaging, completing and redeeming an offer. Upon redemption, the total usage counter for that activity is passed to the operator management system residing server. In a subsequent step, the platform uses interfaces exposed by the mobile operator to credit back the usage to the subscriber's mobile data plan.

Dedicated APN: Some mobile operators may define and configure a dedicated APN (Access Point Name), separate from the ones used for charging the usage of mobile content to the mobile subscriber, for the purpose of defining a different billing account. Under this scenario, the interface routes the application traffic through that special APN. The traffic is charged to the provider and not counted towards the subscriber's allotment, effectively zero-rating it.

DPI-based accounting: Some mobile operators may operate DPI (Deep Packet Inspection) in their network, that is hardware and software that inspects traffic from and to mobile devices for a number of purposes; one such purpose is assigning a charging rule to traffic matching specific pattern signatures. The service provider may define and provision a service signature ahead of time with the mobile operator so that all the client application traffic would effectively be recognized as to being charged to the service provider, effectively zero-rating it for the subscriber.

In some implementations, the client interface can be a website for mobile or desktop browsers and/or included as a web widget in a third-party web application or built on top of a third-party web portal (e.g., a social network web portal). The client system website 105 may be implemented as software, hardware or a combination of software and hardware that is executed on a processing apparatus, such as one or more computing devices (e.g., a computer system as illustrated in FIG. 14).

In some implementations, the client interface can be implemented as an add-on library or Software Development Kit (SDK) that may be integrated by third party developers and service providers. This allows content providers and publishers to incentivize their users with a loyalty program allowing them to earn wireless network credit for engaging with the application and/or the advertisers of the application/content. The add-on component allows third-party content and service providers to personalize the engagement definition and completion policies (e.g., achieving in-app milestones, performing specific tasks, etc.). The add-on component allows for wireless network credit to be earned and stored in the global piggybank or in a dedicated piggybank that is specific to the application. Dedicated, application-specific piggybanks are operated by the same server-side infrastructure maintaining the global piggybank.

The add-on component provides multiple User Interface (UI) presentation layers, e.g., rich-media graphical widgets offering different options for third-party content providers to present and interact with the capabilities of the value exchange platform. The multiple UI presentation layers are built as separate modules for the collection, redemption and exchange of wireless network credit. These modules can include banners, stamps, callouts, and/or separate panes, among other things. The add-on component may provide a pre-packaged way for the advertisers of the third-party application to make their ads eligible to earn wireless network credit upon seeing or interacting with them. For example, a mobile application publisher could configure the add-on component so that the engagement definition includes clicking on their advertisers' advertisement. By offering a mobile bandwidth reward upon engagement with advertisements, the click though and conversion rate for an advertising campaign may be improved and the mobile application publisher may command a higher price for the advertising campaign from their advertisers. By configuring the attributes of the campaign in the management portal (e.g., which advertisements are eligible for the rewards, how much the rewards should be, how the users should be alerted of the reward, where is the landing page upon completion, etc.) and without modifying the mobile app source code and the advertisement creatives with the advertisement agencies, the advertisements can be automatically updated to be "bandwidth-earning capable."

For example, the client system as add-on or SDK 104 may be implemented as software, hardware or a combination of software and hardware that is executed on a processing apparatus, such as the mobile computing device 1450 illustrated in FIG. 14.

The server side portion of the value exchange platform may be a cloud-based service composed of multiple components that are exposed to the client systems via a set of network APIs.

Offer Mediation System:

The offer mediation system interfaces to both the client system and or more advertising networks. In some implementations, the mediation system collects and manages a pipeline of offers for the users of the system. Data reflecting offers from the pipeline may be transmitted, via a network interface of the mediation system, to a client system to facilitate presentation of the offers as a consistent "offer wall" within the client system. The mediation system may receive content items (e.g., advertisements and media) from multiple advertising networks to maintain a steady pipeline for the users. The mediation layer may be implemented as software that is executed on a server and the content items may be received via a network interface of the mediation system.

The mediation system may also receive contextual information known about the users. Contextual information could include age, gender, location, preferred web destinations, app categories installed on their smartphones, typical usage pattern, etc. . . . . For example, contextual information about a user may be passed on anonymously by mobile operators for targeting enrichment or as primary data collected firsthand at signup (user opt-in). Contextual information may be received via a network interface of the mediation system. In some implementations, the mediation system organizes and prioritizes offers in the pipeline based on deterministic information about the users. In some implementations, the organization and prioritization of offers in the pipeline is also based on historical data, such as past completion and engagement rates for similar offers or statistical analysis such as offer acceptance among a population or subset of users.

For example, the offer mediation system 118 may be implemented as software, hardware or a combination of software and hardware that is executed on a processing apparatus, such as one or more computing devices (e.g., a computer system as illustrated in FIG. 14).

Figure 6:
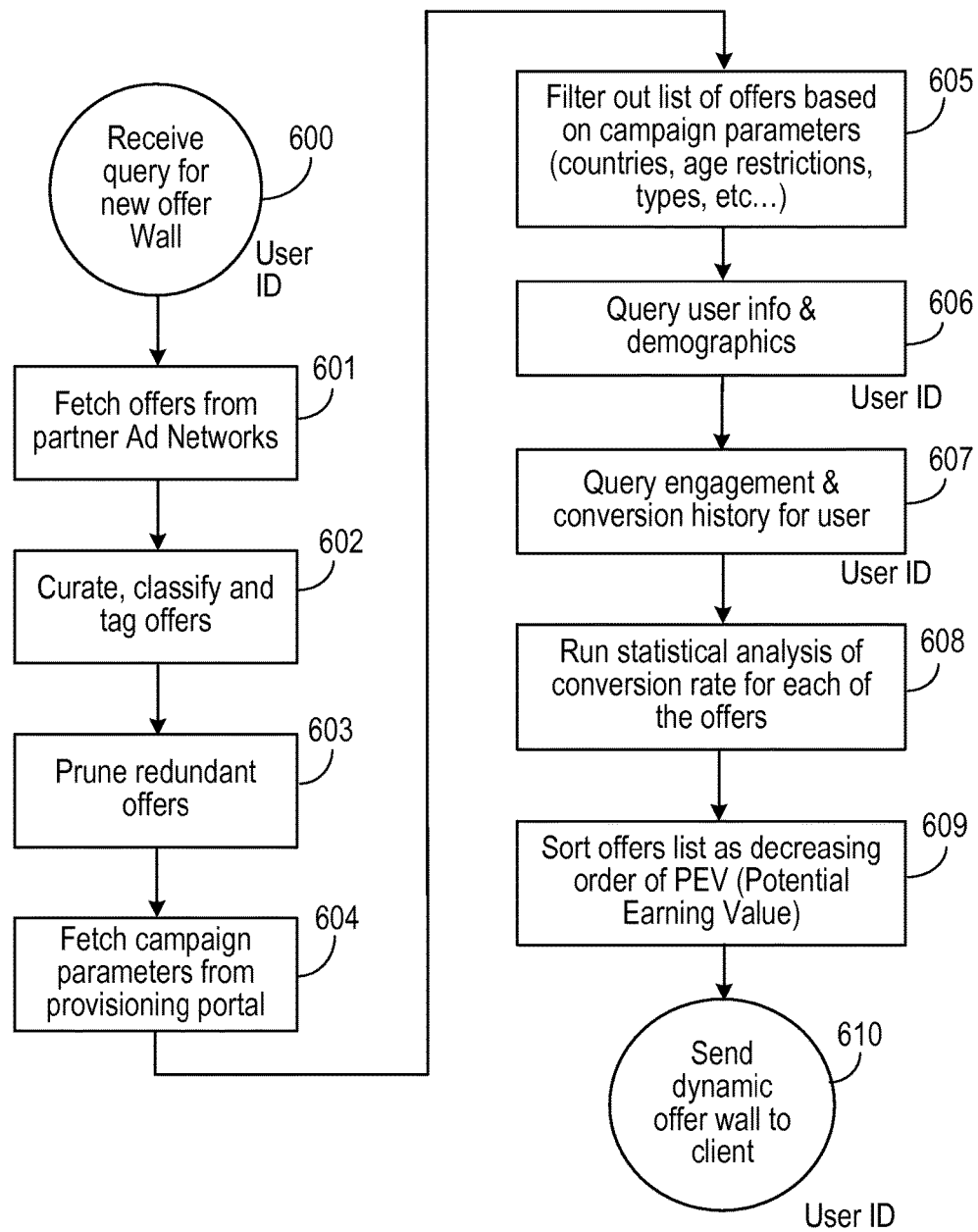
FIG. 6 is a flow chart describing of an example process for generating a dynamic offer wall, which may be generation performed by an offer mediation system.

FIG. 6 is a flow chart describing an example process for generating a dynamic offer wall, which may be performed by the offer mediation system 118. The process starts upon receiving a request 600 made by a client system for a specific user ID. In a first step 601, the offers may be fetched from the partner ad networks and aggregated in a single list. The list may be curated and offers are classified 602 into broad categories (e.g., videos, signups, surveys, etc.) and tagged. Redundant offers may be pruned 603 from the aggregated list. The offer mediation layer fetches 604 the campaign parameters (such as country and age restrictions, offer types, OS restrictions, etc. . . . ) from the management and provisioning portal 112. The campaign parameters may be used to filter out 605 undesired offers from the aggregated list. (For instance, the campaign parameters could include a policy that the offers be rated PG13; all offers not matching that criteria would be filtered out) The mediation system 118 may query 606 the user information and piggybank system 111 for list of information and demographics attributes, if available. The mediation system 118 may also query 607 the user information and piggybank system 111 for historical engagement and conversion metrics, if available. A statistical analysis may be run of conversion rates for each of the offers in the aggregated list of offers and theses offers may be ranked 609 the result by decreasing order of PEV (Potential Earning Value). For example, using historical conversion rates for specific demographics group or similar offers could show that ostatistically, some offers will convert better based on the information collected about the specific user. The result may be a weighted list of the highest reward potential offers likely to be of interest to the user. The weighted list may be used to construct the dynamic offer wall. For example, offers with high PEV may be placed in prominent positions (e.g., top-center, top-left, or center-center) within the offer wall while offers with lower PEV may be placed in less prominent positions within the offer wall. Upon completion, the generated offer wall may be sent 610 to the client system.

In some implementations, the mediation system determines a currency conversion between the monetary value (e.g., dollar equivalent) of the offer in the advertising economy and the marginal cost of cellular bandwidth so that offers may be presented to the user as a simple "ads for bandwidth" exchange (e.g., Complete this offer and earn 100 MB of bandwidth) instead of creating an intermediary conversion step between the advertising economy and the cellular economy. For example, a signup offer for a service can have a monetary value based on the average lifetime value of a user of that service. An improved click through rate for a display advertisement can have a monetary value equivalent in CPM (Cost Per Mille) an advertiser is willing to pay for the uplift. An offer to download a new application can have a monetary value equivalent to the marketing spend the publisher is willing to pay to acquire a new user. Similarly, the marginal cost of cellular bandwidth depends on a number of factors, including type of cellular networks, time and location and the bandwidth wholesale agreement between the service provider and the mobile operator. The wholesale price agreed upon between the service provider and the mobile operator is stored in the management and provisioning system and accessed by the mediation system to convert the monetary value of an advertisement offer into an equivalent wireless network credit amount.

User Information & Piggybank System:

The virtual piggybank is a central repository for all the credits earned by users or gifted by third-party entities to users. It is a virtual account that resides server side. Client side representations of that piggybank may be updated via explicitly polling the system or a system of software callbacks when the balance has been updated server side and the client system needs to be updated. Other user information may also be stored in this system. For example, the user information and piggybank system 111 may store registration data about a user, including a list of linked user mobile devices, and contextual data for the user.

The user information and piggybank system 111 may be implemented as software, hardware or a combination of software and hardware that is executed on a processing apparatus, such as one or more computing devices (e.g., a computer system as illustrated in FIG. 14). In some implementations, user information and piggybank system 111 includes software executed on the same computing device as software implementing the offer mediation system 118. In some implementations, user information and piggybank system 111 and the offer mediation system run on separate computing devices that communicate over a network with each other.

Mobile Network Operator (MNO) Management System:

The operator management system is set of network interfaces to mobile operators' networks to support the following activities:

In some implementations, the MNO management system provides an interface used for authenticating a user of the system and verifying the mobile data plan and/or device is eligible for the redemption of wireless network credit. For example, processes for linking a device and verifying that it is eligible for redemption of wireless network credit are described in relation to FIG. 4A and FIG. 9A-D.

In some implementations, the MNO management system provides an interface used for redemption of wireless network credit from a piggybank to an active mobile data plan. The wireless network credit may be applied towards the mobile data allotment in real-time. For example, processes for redemption of wireless network credit are described in relation to FIG. 2, FIG. 4B, and FIG. 8A-C.

In some implementations, the MNO management system provides an interface used to retrieve and change the details and conditions of a mobile data plan. It may also be used to retrieve real-time balance and usage information for the mobile data plan.

In some implementations, the MNO management system provides an interface used to query certain attributes regarding a wireless subscriber to enrich the targeting of advertising offers. Mobile operators have long had a direct relationship with their customers, yielding access to data that includes personal profiles, location, spending power, and content preferences and consumption. They are sitting on a cache of contextual data about their subscribers—preferences, devices, location, subscription and billing information, and interests. This contextual data may be used to enhance the offer selection process, as described above in relation to the offer mediation system. This information may be provided anonymously via the mobile operator or the mobile operator may offer the user a way to opt in or opt out of the data sharing.

In some implementations, the MNO management system provides an interface used to manage the acquisition of bulk mobile data bandwidth for use as incentives (signup bonuses, referrals, continued engagement), that is wireless network credits distributed as bonus rewards to incentivize users of the system to perform certain operations. The service provider would need interface management interfaces into the MNO to acquire and distribute those wireless network credits outside of those earned through advertising offer redemption.

In some implementations, the MNO management system facilitates wireless network usage crediting and zero-rating, that is credit back to the subscriber the equivalent amount of bandwidth used to interact and complete bandwidth offers (for instance, if the offer is to watch a video through completion, the usage associated with streaming the video and associated media assets would be credited back to the subscriber's data plan). Should the zero-rating be performed using a DPI-based system as described earlier, the MNO management system would collect the traffic signatures required to provision the DPI system deployed by the MNO for the marking of traffic streams.

The MNO management system 119 may be implemented as software, hardware or a combination of software and hardware that is executed on a processing apparatus, such as one or more computing devices (e.g., a computer system as illustrated in FIG. 14). In some implementations, the MNO management system 119 includes software executed on the same computing device as software implementing the offer mediation system 118. In some implementations, MNO management system 119 and the offer mediation system 118 run on separate computing devices that communicate over a network with each other.

Figure 11A:
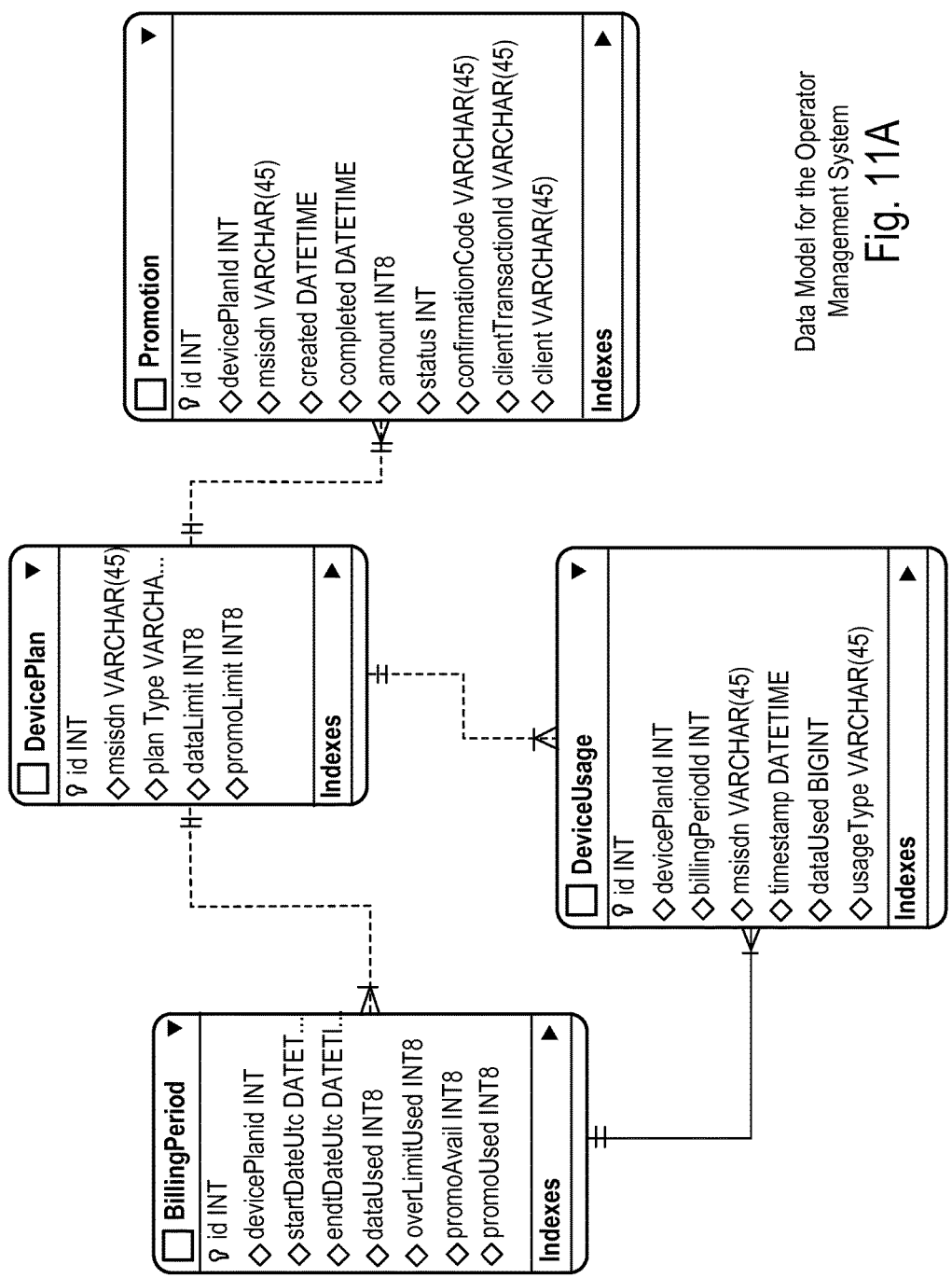

FIG. 11A-C is an example of a data model used by the MNO management system. The MNO management system data model may be used by the MNO management system to efficiently store and access data used to implement the techniques described in this specification.

Figure 12:
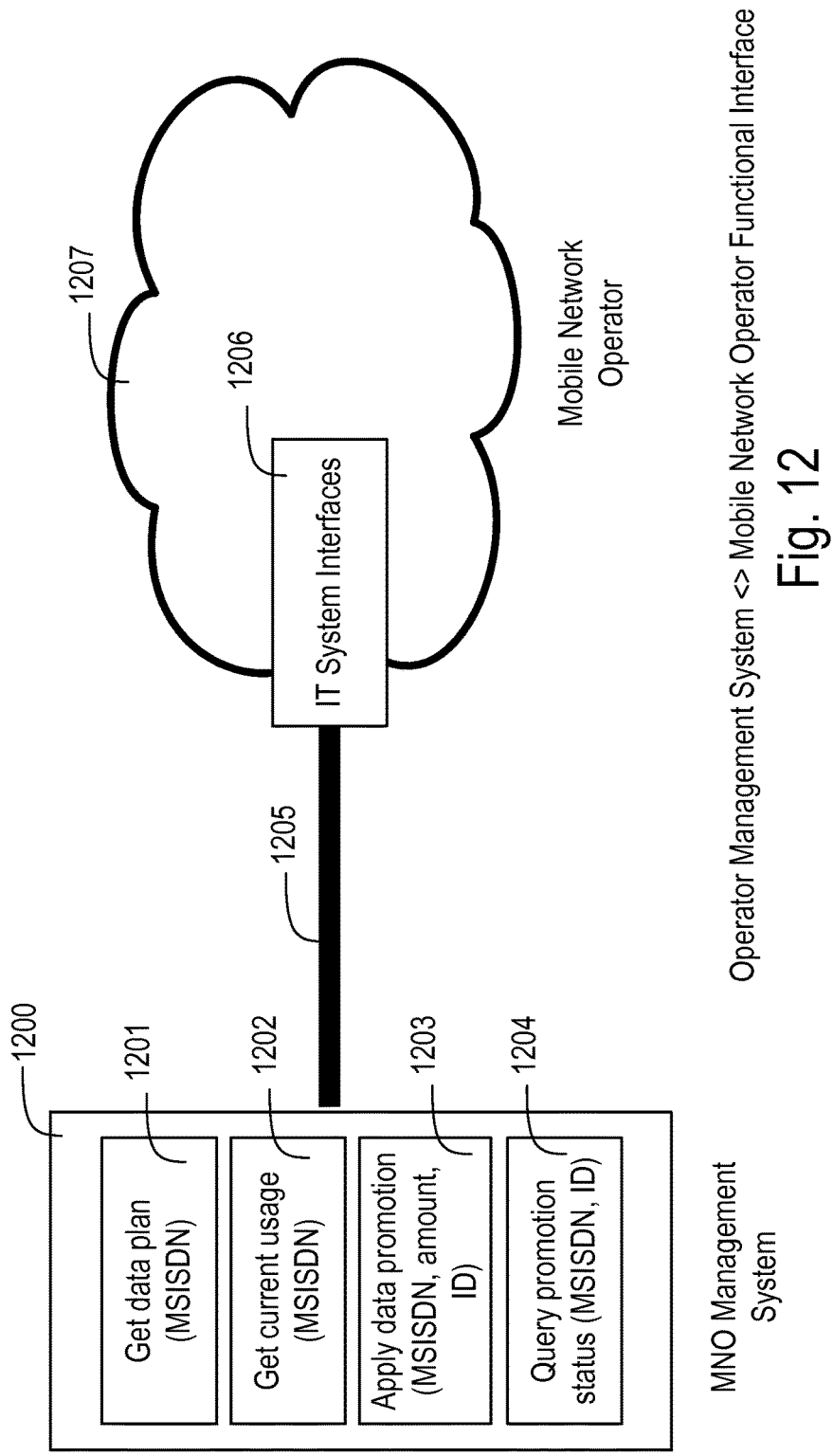
FIG. 12 is a functional diagram describing an example interface between an operator management system and a mobile network operator.
Figure 13B:
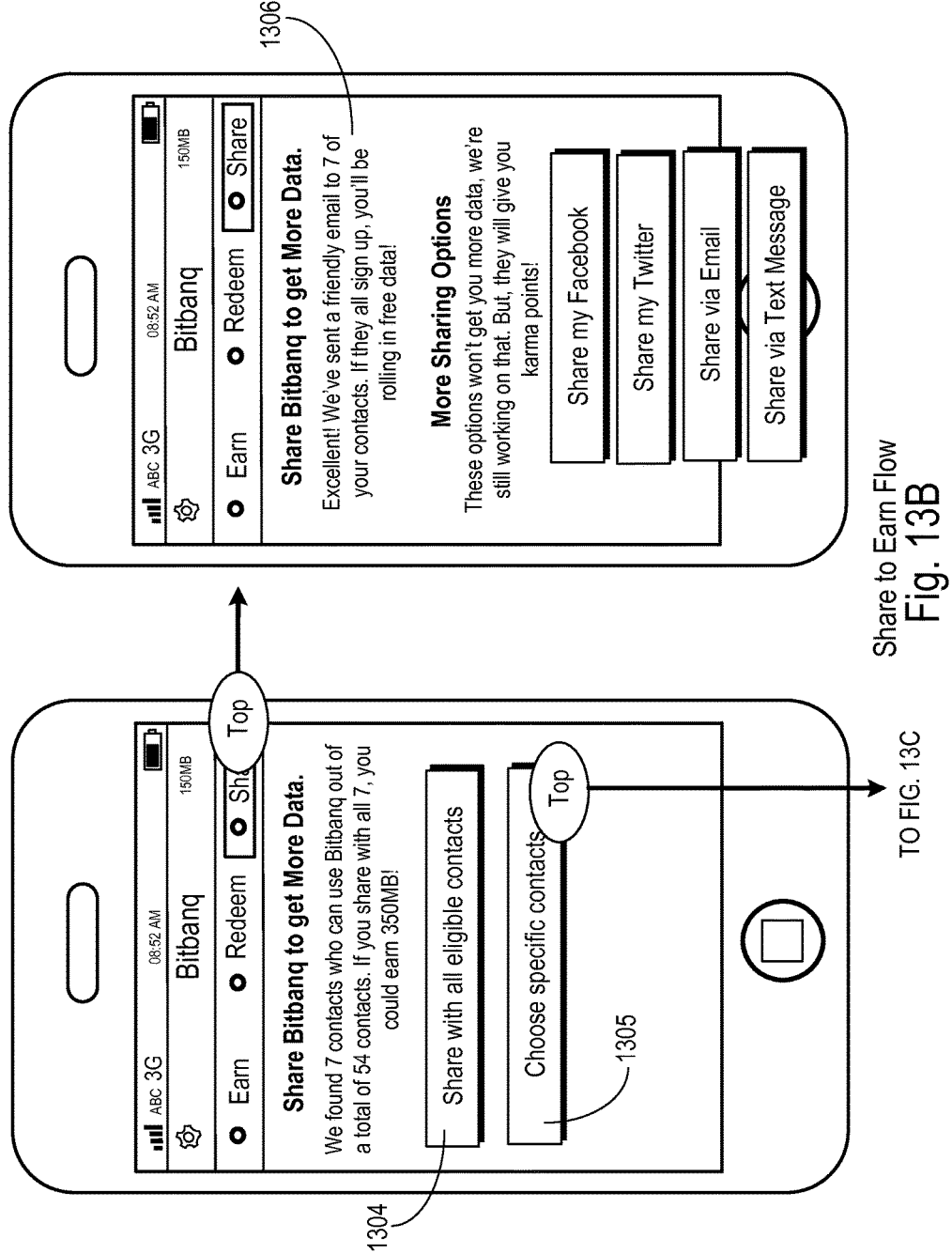
Figure 13E:
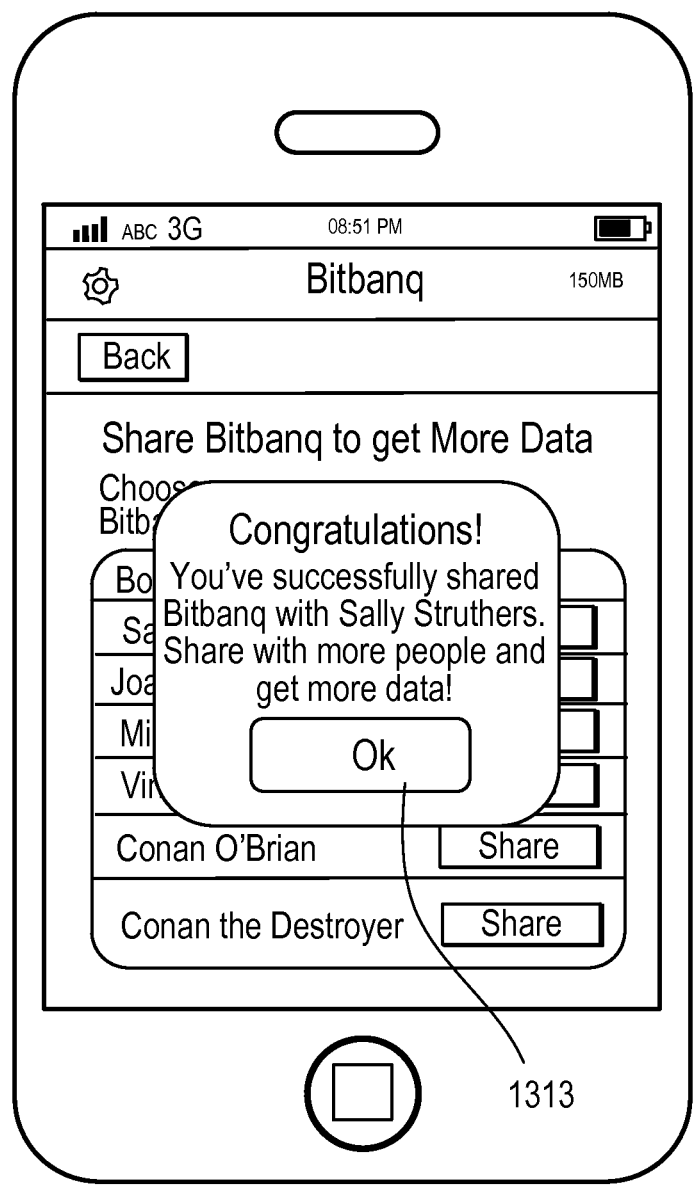

FIG. 12 is a functional diagram describing an example interface between the MNO management system and a mobile network operator. The interaction between the MNO management system 1200 and the mobile network 1207 subsystems, for instance billing, charging, subscriber information databases can be abstracted via a set of special-purposed interfaces 1206 exposed by the MNO's IT system. Connectivity between the MNO management system 1200 and the MNO's network 1207 may be a secure, dedicated network connection 1205, such as a Virtual Private Network (VPN). The IT system interfaces 1206 provides programming interfaces for the tasks performed by the MNO management system, such as getting data plan information associated with a MSISDN 1201, retrieving current usage information for a MSISDN 1202, applying a data promotion on the data plan associated with a MSISDN 1203 (passing an amount expressed as a number of wireless credits to credit), and querying the status of a promotion for a MSISDN by transaction ID 1204.

Management & Provisioning System:

The management & provisioning system 112 may be used by mobile operators, advertisers and content partners to provision and configure the conditions of the value exchange. Mobile operators may use it to specify eligible customers and devices (e.g., by defining eligibility conditions). Mobile operators may also use the management & provisioning system 112 to define redemption policies (e.g., setting a maximum of xxx megabytes that can be redeemed per billing cycle, allowing the redemption of data credits as cash credits on the user's wireless bill). In some implementations, the management & provisioning system 112 may be used by mobile operators to facilitate customer care operations and billing. In some implementations, advertisers and content partners may use the management & provisioning system 112 to define the conditions of the sponsorship campaigns, the targeted demographics, and monitor key performance and analytics 130.

The management & provisioning system 112 may be implemented as software, hardware or a combination of software and hardware that is executed on a processing apparatus, such as one or more computing devices (e.g., a computer system as illustrated in FIG. 14). In some implementations, the management & provisioning system 112 includes software executed on the same computing device as software implementing the offer mediation system 118. In some implementations, management & provisioning system 112 and the offer mediation system 118 run on separate computing devices that communicate over a network with each other.

FIG. 14 shows an example of a generic computer device 1400 and a generic mobile computing device 1450, which may be used with the techniques described here. Computing device 1400 is intended to represent various forms of digital computers, such as laptops, desktops, workstations, personal digital assistants, servers, blade servers, mainframes, and other appropriate computers. Computing device 1450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1400 includes a processor 1402, memory 1404, a storage device 1406, a high-speed interface 1408 connecting to memory 1404 and high-speed expansion ports 1410, and a low speed interface 1412 connecting to low speed bus 1414 and storage device 1406. Each of the components 1402, 1404, 1406, 1408, 1410, and 1412, are interconnected using various busses, and may be mounted on a common motherboard or in other manners as appropriate. The processor 1402 can process instructions for execution within the computing device 1400, including instructions stored in the memory 1404 or on the storage device 1406 to display graphical information for a GUI on an external input/output device, such as display 1416 coupled to high speed interface 1408. In other implementations, multiple processors and/or multiple buses may be used, as appropriate, along with multiple memories and types of memory. Also, multiple computing devices 1400 may be connected, with each device providing portions of the necessary operations (e.g., as a server bank, a group of blade servers, or a multi-processor system).

The memory 1404 stores information within the computing device 1400. In one implementation, the memory 1404 is a volatile memory unit or units. In another implementation, the memory 1404 is a non-volatile memory unit or units. The memory 1404 may also be another form of computer-readable medium, such as a magnetic or optical disk.

The storage device 1406 is capable of providing mass storage for the computing device 1400. In one implementation, the storage device 1406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1404, the storage device 1406, memory on processor 1402, or a propagated signal.

The high speed controller 1408 manages bandwidth-intensive operations for the computing device 1400, while the low speed controller 1412 manages lower bandwidth-intensive operations. Such allocation of functions is exemplary only. In one implementation, the high-speed controller 1408 is coupled to memory 1404, display 1416 (e.g., through a graphics processor or accelerator), and to high-speed expansion ports 1410, which may accept various expansion cards (not shown). In the implementation, low-speed controller 1412 is coupled to storage device 1406 and low-speed expansion port 1414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1400 may be implemented in a number of different forms, as shown in the figure. For example, it may be implemented as a standard server 1420, or multiple times in a group of such servers. It may also be implemented as part of a rack server system 1424. In addition, it may be implemented in a personal computer such as a laptop computer 1422. Alternatively, components from computing device 1400 may be combined with other components in a mobile device (not shown), such as device 1450. Each of such devices may contain one or more of computing device 1400, 1450, and an entire system may be made up of multiple computing devices 1400, 1450 communicating with each other.

Computing device 1450 includes a processor 1452, memory 1464, an input/output device such as a display 1454, a communication interface 1466, and a transceiver 1468, among other components. The device 1450 may also be provided with a storage device, such as a microdrive or other device, to provide additional storage. Each of the components 1450, 1452, 1464, 1454, 1466, and 1468, are interconnected using various buses, and several of the components may be mounted on a common motherboard or in other manners as appropriate.

The processor 1452 can execute instructions within the computing device 1450, including instructions stored in the memory 1464. The processor may be implemented as a chipset of chips that include separate and multiple analog and digital processors. The processor may provide, for example, for coordination of the other components of the device 1450, such as control of user interfaces, applications run by device 1450, and wireless communication by device 1450.

Processor 1452 may communicate with a user through control interface 1458 and display interface 1456 coupled to a display 1454. The display 1454 may be, for example, a TFT LCD (Thin-Film-Transistor Liquid Crystal Display) or an OLED (Organic Light Emitting Diode) display, or other appropriate display technology. The display interface 1456 may comprise appropriate circuitry for driving the display 1454 to present graphical and other information to a user. The control interface 1458 may receive commands from a user and convert them for submission to the processor 1452. In addition, an external interface 1462 may be provided in communication with processor 1452, so as to enable near area communication of device 1450 with other devices. External interface 1462 may provide, for example, for wired communication in some implementations, or for wireless communication in other implementations, and multiple interfaces may also be used.

The memory 1464 stores information within the computing device 1450. The memory 1464 can be implemented as one or more of a computer-readable medium or media, a volatile memory unit or units, or a non-volatile memory unit or units. Expansion memory 1474 may also be provided and connected to device 1450 through expansion interface 1472, which may include, for example, a SIMM (Single In Line Memory Module) card interface. Such expansion memory 1474 may provide extra storage space for device 1450, or may also store applications or other information for device 1450. Specifically, expansion memory 1474 may include instructions to carry out or supplement the processes described above, and may include secure information also. Thus, for example, expansion memory 1474 may be provided as a security module for device 1450, and may be programmed with instructions that permit secure use of device 1450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1464, expansion memory 1474, memory on processor 1452, or a propagated signal that may be received, for example, over transceiver 1468 or external interface 1462.

Device 1450 may communicate wirelessly through communication interface 1466, which may include digital signal processing circuitry where necessary. Communication interface 1466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1468. In addition, short-range communication may occur, such as using a Bluetooth, WiFi, or other such transceiver (not shown). In addition, GPS (Global Positioning System) receiver module 1470 may provide additional navigation- and location-related wireless data to device 1450, which may be used as appropriate by applications running on device 1450.

Device 1450 may also communicate audibly using audio codec 1460, which may receive spoken information from a user and convert it to usable digital information. Audio codec 1460 may likewise generate audible sound for a user, such as through a speaker, e.g., in a handset of device 1450. Such sound may include sound from voice telephone calls, may include recorded sound (e.g., voice messages, music files, etc.) and may also include sound generated by applications operating on device 1450.

The computing device 1450 may be implemented in a number of different forms, as shown in the figure. For example, it may be implemented as a cellular telephone 1480. It may also be implemented as part of a smartphone 1482, personal digital assistant, or other similar mobile device.

In this specification when we have used the following terms, we have used the terms in a broad sense as suggested below.

| We have used the term below broadly . . . | . . . to include, for example, any of what we refer to below, among other things. |
| --- | --- |
| Mobile device or wireless device | Any electronic device that can be carried around by a user and can communicate wirelessly, for example, telephones, computers, electronic pads and tablets, laptops, notebooks, and other devices that operate on cellular or other wireless telephone networks or on wireless networks such as WiFi, Bluetooth, and others. |
| Wireless networks | Any voice or data communication network that includes a wireless portion through which a user device communicates, such as a cellular network, the Internet, LANs, WANs, VPNs, WiFi, and Bluetooth to name a few. |
| Mobile operators | Any parties that own, control, or operate facilities of any kind that provide wireless communication services to customers, such as cellular communication operators and short-range wireless network operators. |

-continued

| We have used the term below broadly . . . | . . . to include, for example, any of what we refer to below, among other things. |
| --- | --- |
| Wireless communication services or mobile communication services | Any kind of facility, service, equipment, or capability that enables or delivers or provides wireless communication by a mobile device, such as communication of voice or data or content, including mobile and other broadband services. |
| Broadband services | Wireless or mobile or other communication services that provide a large enough throughput or bandwidth to permit images, videos, and audio to be presented, for example, in real-time. |
| Credits | Any sort of representation of value between a party who owns the credit and a party for whom it represents a liability, such as, for example, a voucher, a chit, an entry on an account, an IOU, a reward, points in a loyalty program, can be used to, |
| Advertising | Any kind of presentation intended, for example, to inform or influence then thinking or behavior of others with respect to a product, a service, or an entity, including, communications, notices, postings, banners, content, and any other kinds of material or indicia or packaging or display. |
| Data plan | Any kind of program that defines an ongoing arrangement for supplying data communication services such as wireless or mobile communication services, or broadband services to devices such as mobile devices. |
| Loyalty program | A program designed to encourage customers of a product or service to continue or enhance their relationship to the product or service or to the entity that supplies it or to promote the initiation of such a relationship by new or previous customers. |
| Offers | Proposals by offering parties to provide value of one kind to other parties in exchange for conduct of defined kinds by the other parties. |
| Content item | A content item is any data that can be provided over a communications network. Examples of content items include: an advertisement possibly including a link to a landing page, a video file, an audio file, streaming video, streaming audio, a web form to be filled in by a user, a game, and a mobile app, among others. |

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The logic flows depicted in the figures do not require the particular order shown, or sequential order, to achieve desirable results. In addition, other steps may be provided, or steps may be eliminated, from the described flows, and other components may be added to, or removed from, the described systems.

Other embodiments are within the scope of the following claims.

The invention claimed is:

1. A computer-implemented method comprising:
identifying, through a dedicated interface for at least one of two or more accessible ad networks, an offer by a participant in the ad network to pay for an amount of usage of a metered wireless network that is to be expended to download a mobile app or data for a mobile app to a mobile device of a user;
exposing the offer through a user interface to enable the user to invoke a downloading of the mobile app or the data for the mobile app;
causing the mobile app or the data for the mobile app to be downloaded to the mobile device of the user wirelessly through the metered wireless network, the metered wireless network being operated by a supplier of wireless communication services, the mobile app or the data for the mobile app comprising a tracker to report the downloading of the mobile app or the data for the mobile app, wherein data traffic of the downloading of the mobile app or the data for the mobile app is routed through a first access point name (APN) dedicated to the downloading of the mobile app or the data for the mobile app, and wherein data traffic other than the downloading of the mobile app or the data for the mobile app is routed through a second APN different from the first APN;
receiving a confirmation that the mobile app or the data for the mobile app has been downloaded to the mobile device,
obtaining an amount of the data to be used to download the mobile app or the data for the mobile app;
calculating a credit for additional bandwidth based on the data from one or more trackers and the obtained size;
causing a server to apply, through a network interface exposed by the supplier of wireless communication services, the credit on a data plan of a metered wireless services account that is maintained by the supplier of wireless communication services on the metered wireless network;
identifying a marginal cost of the additional bandwidth based, at least in part, on a wholesale agreement between the participant in the ad network and the supplier of wireless communication services; and
charging the marginal cost associated with the credit to the participant in the ad network.

2. The method of claim 1, in which the offer is contingent on completion of a registration transaction.

3. The method of claim 1, in which the offer is contingent on a submission of a comment or review.

4. The method of claim 1, in which the mobile app or the data for the mobile app is downloaded over the metered wireless network and the usage required to present the content item is free to the user.

5. A computer-implemented method performed by one or more processing devices, the method comprising:
receiving data specifying several content items from one or more-participant in an ad network, each content item being coupled to an offer for communication services on a wireless network in exchange for the content item being presented, the offer being redeemable for additional bandwidth or zero-rated bandwidth to be added to a data plan for at least one metered wireless network;
selecting one or more of the offers for presentation to a user;
exposing the offer through a user interface to enable the user to download a mobile app or data for a mobile app to a mobile device of the user, wherein data traffic of the downloading of the mobile app or the data for the mobile app is routed through a first access point name (APN) dedicated to the downloading of the mobile app or the data for the mobile app, and wherein data traffic other than the downloading of the mobile app or the data for the mobile app is routed through a second APN different from the first APN;
receiving a confirmation from the ad network that the offer has been accepted,
calculating a credit for additional bandwidth based on the data from one or more trackers and a size of a mobile app or a size of data for a mobile app;
applying the credit for additional bandwidth to a data plan of a metered wireless services account that is maintained by a supplier of wireless communication services on a metered wireless network;
identifying a marginal cost of the additional bandwidth based, at least in part, on a wholesale agreement between the participant in the ad network and the supplier of wireless communication services; and
charging the marginal cost associated with the credit to a paying party.

6. The method of claim 5, further comprising:
determining a conversion rate for converting a bid associated with one of the several content items to an offer for credit.

7. The method of claim 5, further comprising:
receiving data reflecting the presentation of a second content item from a second user device; and
adding a credit corresponding to an offer associated with the second content item to the account.

8. The method of claim 5, further comprising:
receiving contextual data about the user from the supplier of the wireless communication services.

9. The method of claim 8, in which the selection of offers for presentation to the user is based on the contextual data about the user.

10. The method of claim 5, in which the one or more of the offers are selected based in part on campaign parameters received from the ad network.

11. The method of claim 5, further comprising:
receiving parameters defining a redemption policy of the supplier of wireless communication services, including a limitation on an amount of credit that can be redeemed in the metered wireless services account.

12. The method of claim 5, further comprising:
verifying that the metered wireless services account is eligible to redeem the credit.

13. The method of claim 1, wherein monitoring the amount of bandwidth used to provide the content item on the metered wireless network includes receiving information from one or more trackers.

14. The method of claim 13, wherein the trackers are embedded in the content item.

15. The method of claim 1, wherein the content item is a video and monitoring the amount of bandwidth includes determining a portion of the video watched by the user.

16. The method of claim 1, further comprising identifying packets on the metered wireless network matching a pattern signature includes performing deep packet inspection on the metered wireless network.

17. The method of claim 1, further comprising encoding a predetermined pattern signature into packets for the mobile app or the data for the mobile app.

* * * * *